(12) United States Patent
Tsuchiya et al.

(10) Patent No.: US 6,262,403 B1
(45) Date of Patent: Jul. 17, 2001

(54) APPARATUS FOR ALIGNING ENDS OF DIFFUSION BONDED MATERIALS

(75) Inventors: Masaki Tsuchiya, Yokkaichi; Takao Shimizu; Hiroaki Suzuki, both of Nagoya, all of (JP)

(73) Assignee: Daido Tokushuko Kabushiki Kaisha, Aichi (JP)

( * ) Notice: Subject to any disclaimer, the term of this patent is extended or adjusted under 35 U.S.C. 154(b) by 0 days.

(21) Appl. No.: 09/382,122

(22) Filed: Aug. 24, 1999

Related U.S. Application Data

(62) Division of application No. 08/845,029, filed on Apr. 21, 1997, now Pat. No. 5,975,405.

(30) Foreign Application Priority Data

| Apr. 23, 1996 | (JP) | 8-127807 |
| Apr. 23, 1996 | (JP) | 8-127808 |
| Apr. 24, 1996 | (JP) | 8-128970 |
| Apr. 30, 1996 | (JP) | 8-134348 |
| Mar. 7, 1997 | (JP) | 9-70632 |
| Mar. 7, 1997 | (JP) | 9-70633 |
| Mar. 10, 1997 | (JP) | 9-74579 |
| Mar. 10, 1997 | (JP) | 9-74582 |

(51) Int. Cl.$^7$ ................................. B23K 13/01
(52) U.S. Cl. ............... 219/607; 219/612; 219/614; 219/633; 219/643; 228/44.5
(58) Field of Search ................... 219/633, 637, 219/647, 659, 603, 602, 607, 611, 612, 614, 635, 643; 228/157, 194, 44.5, 44.3; 269/43, 156

(56) References Cited

U.S. PATENT DOCUMENTS

| 351,550 | 10/1886 | Weller | 269/156 |
| 4,176,269 | 11/1979 | Merrick et al. | 269/43 |
| 5,206,980 | 5/1993 | Chapman | 269/43 |
| 5,875,954 | * 3/1999 | Kishi et al. | 228/94 |
| 5,975,405 | * 11/1999 | Tsuchiya et al. | 228/44.5 |

FOREIGN PATENT DOCUMENTS

8/300166   11/1996   (JP) .

* cited by examiner

Primary Examiner—Tu Ba Hoang
(74) Attorney, Agent, or Firm—Arent Fox Kintner Plotkin & Kahn, PLLC

(57) ABSTRACT

A diffusion bonding method having a step of adjusting ends of material to be bonded before bonding the material after setting the materials in the diffusion bonding apparatus, whereas a diffusion bonding apparatus having a means of finishing ends of materials to be bonded so that both ends face parallel to each other.

1 Claim, 36 Drawing Sheets

F I G. 1 6
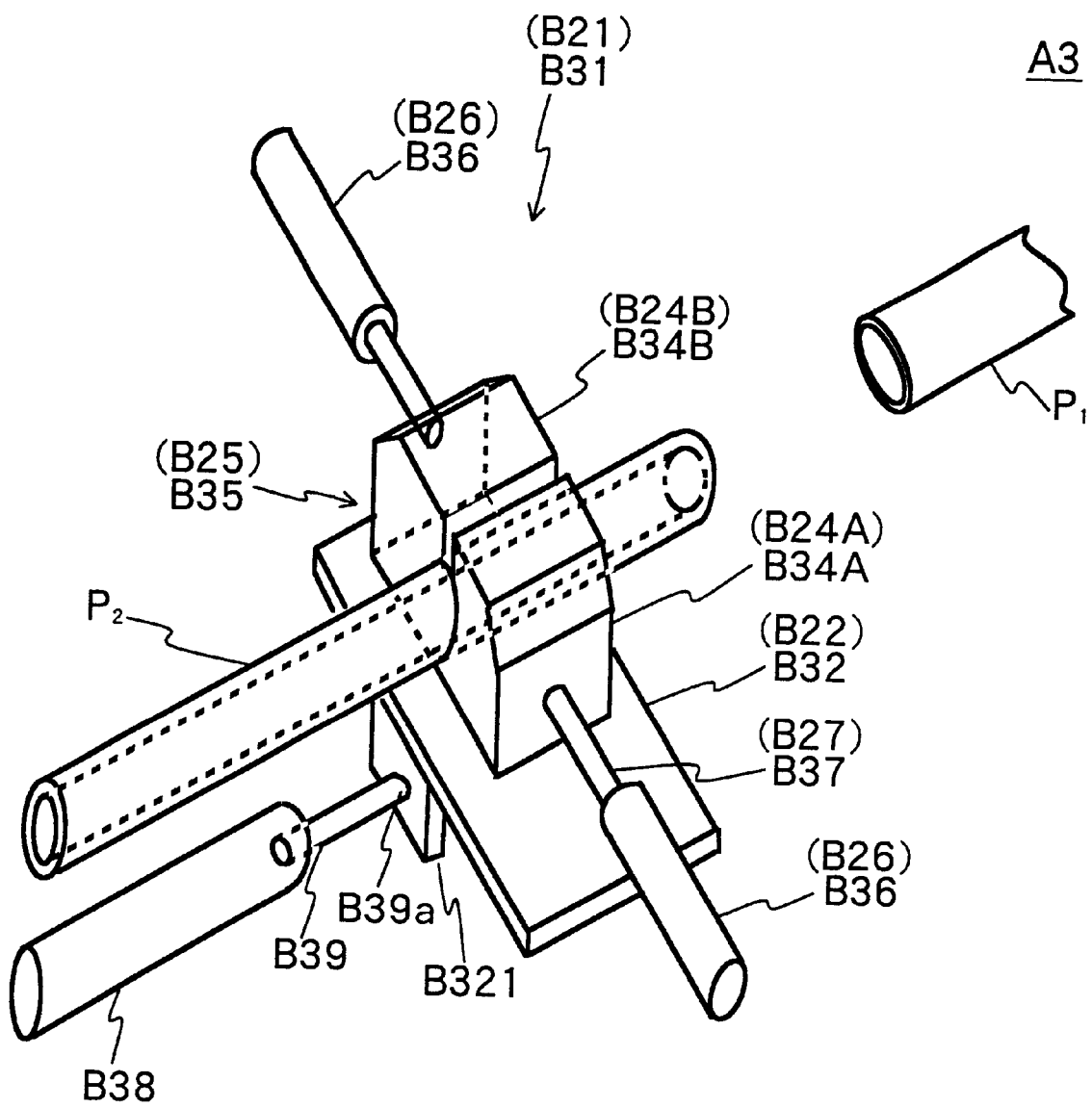

F I G. 1 7
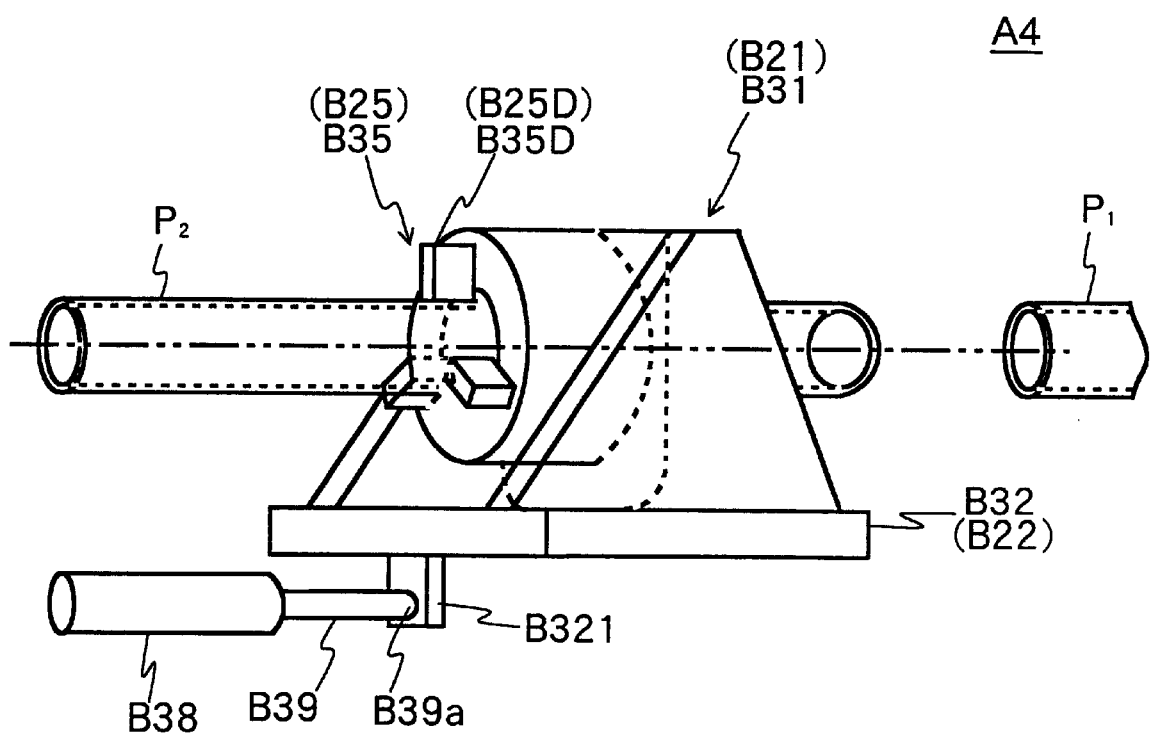

F I G. 1 8
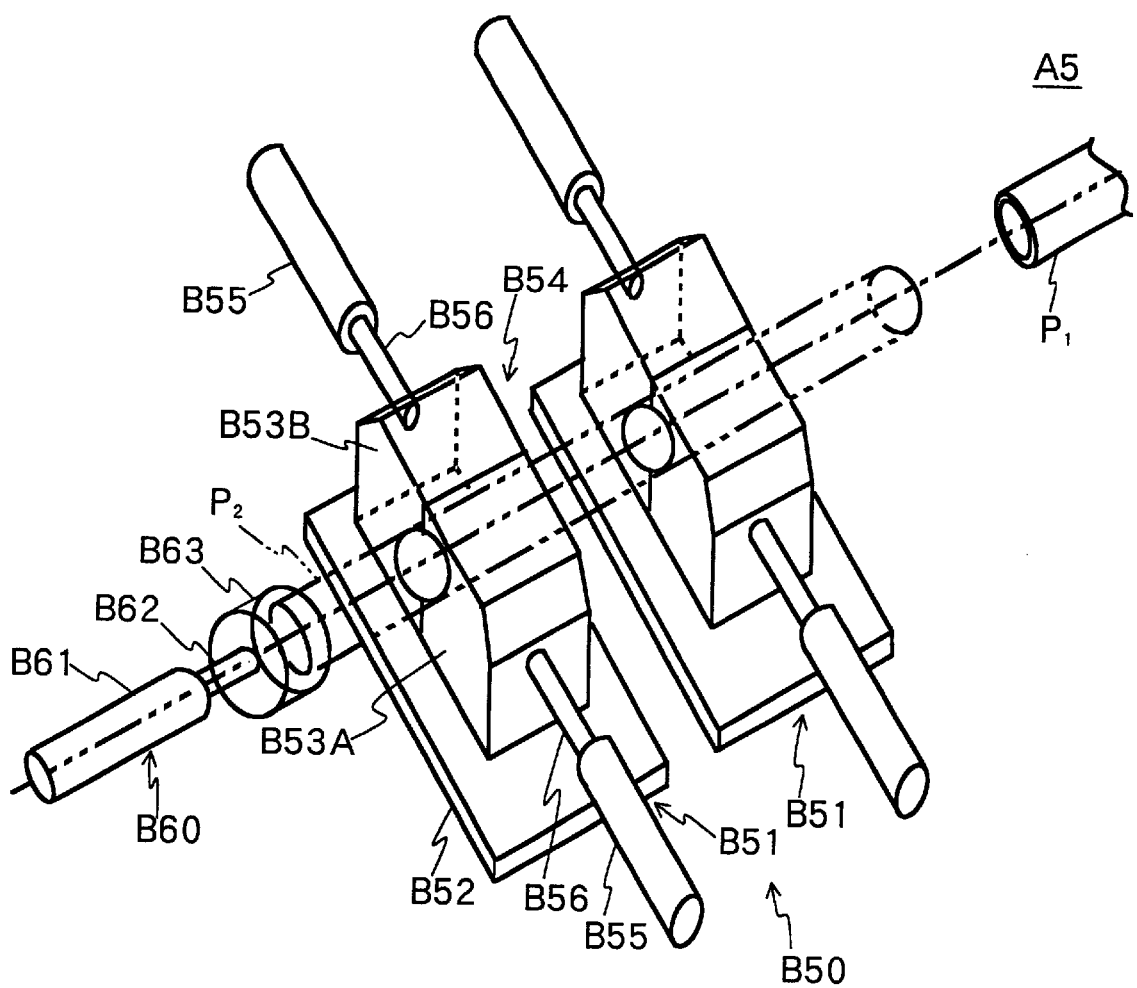

F I G. 3 9
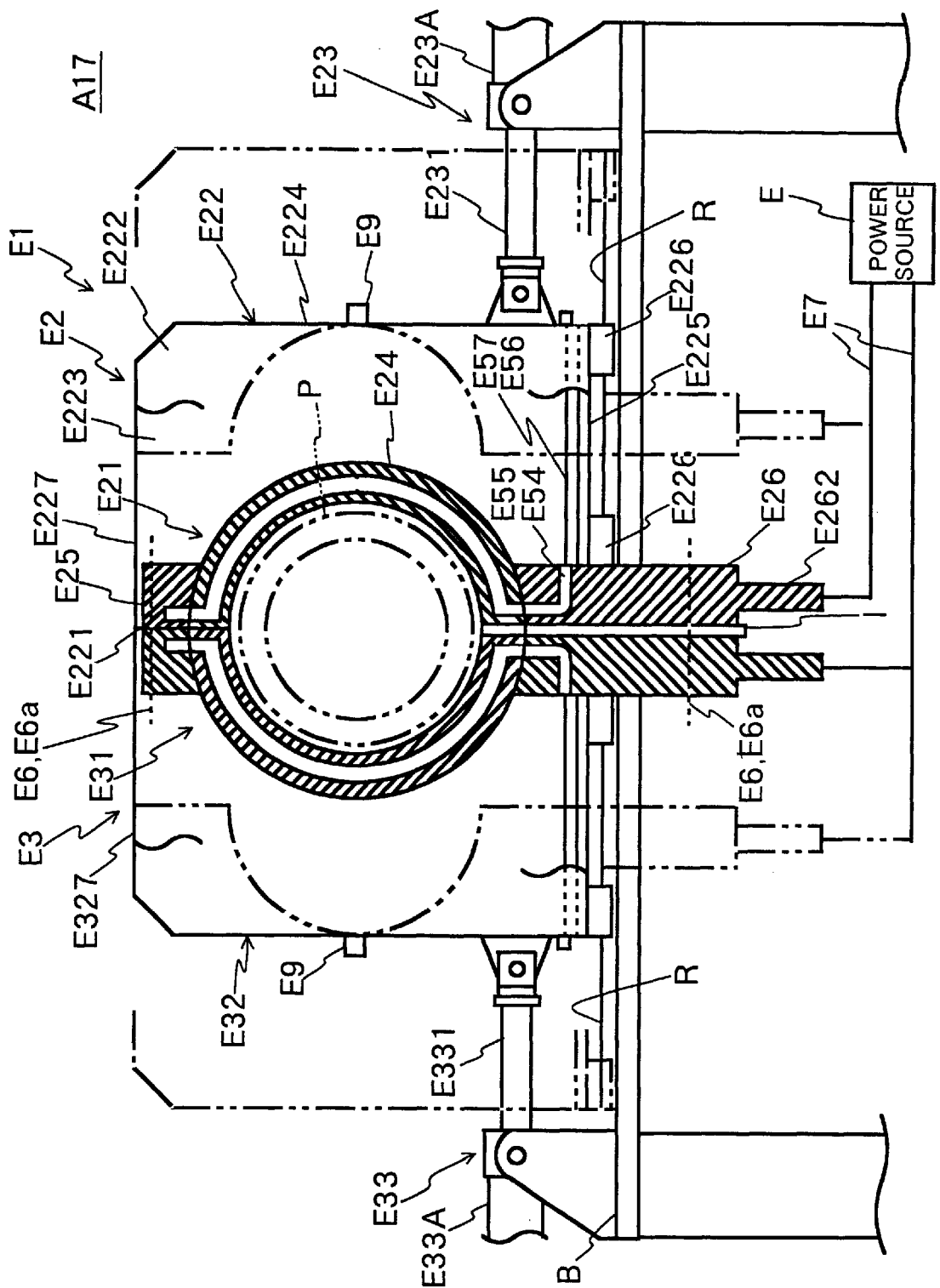

APPARATUS FOR ALIGNING ENDS OF DIFFUSION BONDED MATERIALS

CROSS REFERENCE TO RELATED APPLICATIONS

This application is a divisional of U.S. patent application Ser. No. 08/845,029, filed Apr. 21, 1997 now U.S. Pat. No. 5,975,405. The subject matter of application Ser. No. 08/845,029 is hereby incorporated by reference.

TECHNICAL FIELD

The present invention relates to a diffusion bonding method and a diffusion bonding apparatus. To be more specific, it relates to a diffusion bonding method and a diffusion bonding apparatus which do not require intricate work to adjust both materials to be bonded when setting them in the diffusion bonding apparatus.

BACKGROUND ART

A diffusion bonding method has been known as one of the methods for bonding metallic materials. When bonding metals by this method, because the surface roughness of materials to be bonded significantly affects the joint efficiency, the ends of the materials are generally cut or ground to achieve a desired roughness before the materials are set in the diffusion bonding apparatus for diffusion bonding.

In this general procedure, materials to be bonded are set in a diffusion bonding apparatus without adjusting the ends of the materials to face parallel to each other, assuming that a proper contact is obtained at the ends of the material to be bonded by creep caused by pressure and heat applied thereto prior to bonding.

However, a study made by the inventors of the present invention has discovered that when bonding tubes or pipes by this generally employed method of diffusion bonding, joint efficiency drops because some parts may not contact each other under a desired pressure depending on a certain degree of parallel of materials to be bonded.

Therefore, when bonding tubes or pipes through this generally employed diffusion bonding method, it is essential to adjust the ends of the materials to be bonded to face parallel to each other before setting the materials in a diffusion bonding apparatus. However, because most pieces of tube or pipe to be bonded are long, the adjustment is troublesome and time-consuming.

However, most products manufactured by diffusion bonding are relatively small, and it is impossible to employ a prior art diffusion bonding apparatus in the manufacture of extensively long pieces such as oil-well pipes which extend several kilometers.

Therefore, the arrival of a diffusion bonding apparatus suitable to the manufacture of extensively long pieces is much awaited by manufacturers of extensively long pipes such as oil-well pipes.

Another problem of a prior art diffusion bonding apparatus is that when bonding metallic materials by the prior art diffusion bonding apparatus, a difference may occur in the joint of the two materials as shown in FIG. 46 (*a*). Marks T1 and T2 in FIG. 46 represent materials which are bonded.

Subsequently, when a difference occurs, it remarkably weakens the strength, especially the fatigue strength, of the joint. Consequently, when such a difference occurs, it is usually corrected by forming a taper a and b at the joint, as shown in FIG. 46 (*b*), by applying cutting or grinding finishing thereto.

However, correction in such a way may lead to a drop in the work efficiency at diffusion bonding since the correction work is troublesome, because the work is carried out for a materials which becomes much longer after being bonded.

Furthermore, induction heating has usually used a heating coil c as shown in FIG. 47 in which the material T to be heated is inserted, heated and then pulled out.

However, when heating an extensively long piece such as a pipe, insertion and extraction of the material T in and out of the heating coil c takes much time because of its long length, thus impairing the productivity.

Furthermore, in diffusion bonding, it is the conventionally employed method that a bonding part j is covered with a gas jacket d as shown in FIG. 48 in order to prevent the oxidation of the bonding part j. Because of a gap created between the gas jacket d and materials T and T, inert gas (herein after called shielding gas) is supplied to the gas jacket d from a nozzle e to prevent air from going into the gas jacket d, and the bonding part j is bonded while being shielded. In other words, with the shielding gas leaking out of the gap between the gas jacket d and the materials T and T, air is prevented from going into the gas jacket d while materials are being bonded. In FIG. 48, the mark c represents a high frequency heating coil.

However, when the materials are bonded while letting the shielding gas go out in the above manner, it creates a flow of gas inside the gas jacket d cooling the circumference of the bonding part j. As a result, the bonding part is not sufficiently heated causing unsatisfactory quality and strength in joints.

The present invention is made to resolve the above-mentioned disadvantages of the prior arts.

Namely, it is an object of the present invention to provide a diffusion bonding method and a diffusion bonding apparatus that will facilitate the setting of the materials in a diffusion bonding apparatus when bonding long pieces of tubes or pipes.

It is another object of the present invention to provide a diffusion bonding apparatus which is applied to manufacture of extensively long pipes such as oil-well pipes which extend several kilometers.

It is another object of the present invention to provide a method and an apparatus for adjusting position of materials to be bonded by diffusion bonding so that a difference in the joint is prevented.

It is another object of the present invention to provide a heating coil to heat speedily an extensively long piece such as a pipe.

It is another object of the present invention to provide a shielding device and the shielding method for a bonding part in diffusion bonding which do not cause the degradation in quality and strength in joints.

SUMMARY OF THE INVENTION

The first aspect of the present invention is a diffusion bonding method which comprises a step of adjusting the ends of materials to be bonded before bonding after they are set in a diffusion bonding apparatus.

In the diffusion bonding method under of the first aspect of the present invention, the ends of the materials to be bonded are finished to face parallel to each other as desired at the time of the above-mentioned adjustment.

The second aspect of the present invention is a diffusion bonding apparatus which comprises a finishing means to finish the ends of the materials so that they face parallel to each other in the diffusion bonding apparatus.

To be specific, the diffusion bonding apparatus of the second aspect of the present invention comprises a finishing means comprising a machining means which is symmetrically placed between two materials to be bonded, a first driving mechanism to move said machining means forward and backward for the materials to be bonded and a second driving mechanism to move said first driving mechanism sideways; or a first driving mechanism to move said machining means sideways and a second driving mechanism to move the first driving mechanism forward and backward for the materials to be bonded; a bed; a fixed clamp and a mobile clamp which are placed on the bed facing to each other; and a driving means to move said mobile clamp.

Since the first and second aspects of the present invention is comprised in the above way, upon completion of finishing the ends of the materials, the ends of the materials to be bonded can face parallel to each other as desired. Consequently, there will be no need to adjust the ends of the materials in order for them to face parallel to each other when setting the materials in the diffusion bonding apparatus, facilitating an easy and quick setting of the materials in the diffusion bonding apparatus.

The third aspect of the present invention is a diffusion bonding apparatus comprising a material feeding section and a material discharge section installed in that order, through which material to be bonded are fed from upstream side and bonded materials are discharged toward downstream side wherein said material feeding section has a mechanism to move the material to be bonded to a place where its end is bonded with the other, and to pressurize the bonding part of the materials; and said material discharging section has a mechanism to clamp the material to be bonded. Here, a material to be bonded is fed and discharged horizontally or vertically.

In the third aspect of the diffusion bonding apparatus of the present invention, the material feeding section has, for example, a clamping means to clamp the material to be bonded, a transporting and pressurizing means which transports the clamping means to a predetermined place and pressurizes the bonding part; a guiding means to guide the material to be bonded, a feeding and pressurizing means which feeds the material into the place where it is bonded, and pressurizes the bonding part; or a guided feeding and pressurizing means which feeds the material to be bonded into the place where it is bonded with guide and pressurizes the bonding part.

It is preferable that the guide is carried out while upward movement of the material to be bonded is prevented.

The fourth aspect of the present invention is a diffusion bonding apparatus comprising a lower mechanism to clamp a material to be bonded vertically, and an upper mechanism positioned upside of the lower mechanism to move a material to be bonded upwards and downwards with clamping.

In the diffusion bonding apparatus of the fourth aspect of the present invention, the lower mechanism has a base plate positioned horizontally and free open and close clamping means installed on the upper end and the lower end of the base plate respectively; and the upper mechanism has a base plate positioned horizontally at suitable position above the lower mechanism, a pressurizing unit, with a free open and close clamping means, which moves downwards and upwards freely and is located under the base plate of the upper mechanism.

It is preferable that the pressurizing unit has an adjusting means to adjust the pressurizing power.

Since the third and fourth aspects of the present invention is comprised in the above way, after the fore-end of the material fed through the material feeding section contacts the back-end of the preceding material clamped at the material discharging section, the bonding part is pressurized with the pressurizing means and heated for diffusion bonding. A cycle of these procedures is repeated until an extensively long pipe in a desired length is manufactured.

The fifth aspect of the present invention is a diffusion bonding apparatus comprising a position adjusting means to adjust a difference in position between two materials to be bonded at their bonding point is detected, and such a difference in position is corrected by adjusting position of the materials to be bonded.

The sixth aspect of present invention is a diffusion bonding apparatus comprising a position adjusting means to correct a difference in position between the two materials to be bonded at their bonding point by placing an insert between two materials to be bonded. In this case, it is preferable that the insert for adjustment has a convex fitter in a spherical shape on each end thereof, whereas the materials to be bonded have concave fitters in a spherical shape corresponding to the convex fitters in a spherical shape on the ends to be bonded.

Since both sides of the materials are bonded without having a difference in position, a joint will be made without a difference in alignment. As a result, a loss of strength, especially a loss of fatigue strength, due to a difference in the joint of the two materials is prevented.

The seventh aspect of the present invention is a diffusion bonding apparatus with a clamping mechanism which has a sufficient clamping force while causing no deformation to the bonding parts, which otherwise leads to a drop in the strength in the joints.

The eighth aspect of the present invention is a diffusion bonding apparatus with a clamping mechanism which comprises a first clamping section to clamp the vicinity of the end of the material to be bonded, and a second clamping section to clamp the material at a position further from the end of the material; wherein the first clamping section prevent deformation of the end of the material, while the second clamping section clamps the material firmly so that a predetermined pressure is imposed on the bonding part of the materials. It is preferable that the first clamping section and the second clamping section are located a distance five times longer than the diameter of the material to be bonded.

The clamping mechanism of the diffusion bonding apparatus of the eighth aspect of the present invention has a clamping section comprises; a first block pawl fixed on a bed or a mobile table in the main body of the diffusion bonding apparatus with its clamping part pointing upward, a second block pawl and a third block pawl which are fixed on the bed or the mobile table in the main body of the diffusion bonding apparatus at their bottoms with fixtures while being allowed to rotate freely, and with their clamping parts facing each other which tops are driven by a driving means installed on the opposite side of their clamping parts; or a first block pawl fixed on the bed or the mobile table of the main body of the diffusion bonding apparatus with its clamping part pointing upward, a second block pawl positioned forming a certain angle with the first block pawl and driven with a driving means which is installed on the bed or the mobile table with fixtures; a third block pawl positioned forming a certain angle with the first block pawl and driven with the driving means installed on the bed or the mobile table with fixtures; or a first driving means to drive a first block pawl supported by a supporter located in the diffusion bonding apparatus; a second driving means to drive a second block pawl supported by the supporter located in the diffusion bonding apparatus with a certain angle for the first driving meams, and a third driving means to drive a third block pawl supported by the supporter located in the diffusion bonding apparatus with a certain angle for the first driving means.

Since the clamping mechanism under the seventh and eighth aspects of the present invention is constructed in either one of the ways mentioned above, it will not create no deformation in the ends of the materials while clamping them. Consequently, the strength in the joint will no longer drop due to a deformation.

The nineth aspect of the present invention is a diffusion bonding apparatus with a heating coil used for induction heating, being split and joined freely.

To be more specific, the heating coil under the nineth aspect of the present invention is used for induction heating and comprises a right block and a left block corresponding to the right block; wherein said right block comprising a right heating coil, a right gas jacket covering said right heating coil, and a driving means which moves forward and backward the right heating coil and the right gas jacket for the material to be heated; and said left block comprising a left heating coil, a left gas jacket covering the left heating coil, and a driving means which moves forward and backward the left heating coil and the left gas jacket for the material to be heated. It is preferable that the gas jacket feeds more gas from the upper side thereof in the heating coil under the nineth aspect of the present invention.

The heating coil comprises, for instance, a circular coil and connecting components which are incorporated into both ends of the coil.

Furthermore, in the heating coil under the nineth aspect of the present invention, it is preferable that the connecting components of the light block and the connecting components of the left block are clamped to each other, and that the heating coil is water cooled.

The tenth aspect of the present invention is a diffusion bonding apparatus with an induction heating device having the above-mentioned heating coil.

The eleventh aspect of the present invention is an induction heating method wherein induction heating is carried out while the distance between the lower outside of a material to be heated and the lower inside of the heating coil is kept shorter than the distance between the upper outside of the material to be heated and the upper inside of heating coil.

The twelfth aspect of the present invention is an induction heating method wherein induction heating is carried out while the upper outside of a material to be heated is more cooled than other part of the material to be heated by feeding more gas from the upper side of the gas jacket.

Under the nineth aspect to the twelfth aspect of the present invention, the construction of the heating coil as mentioned above allows for the following procedure: to split the heating coil, set a long material such as a pipe in a specified place, join the heating coil, treat the material with heat by induction heating, re-split the heating coil, and remove and transfer the heated material to the place where it receives the next processing step. Thus, the productivity of the heating of long materials such as pipes will improve.

The thirteenth aspect of the present invention is a diffusion bonding apparatus with a shielding device for a bonding part in diffusion bonding comprising a main gas jacket with a high frequency heating coil, and a front gas jacket and a back gas jacket incorporated in the feeding side and the discharging side of the main jacket respectively.

In the shielding device for a bonding part in diffusion bonding under the thirteenth aspect of the present invention, it is preferable that the front gas jacket and back gas jacket comprises several blocks where shielding gas is supplied; that the main gas jacket, front gas jacket and back gas jacket are divided into two parts respectively and each part freely moves forward and moves backward for the materials to be bonded.

The fourteenth aspect of the present invention is a shielding method for a bonding part in diffusion bonding employing a shielding device which comprises a main gas jacket with a high frequency heating coil, and a front gas jacket and a back gas jacket incorporated in the feeding side and the discharging side of the main gas jacket respectively wherein the internal pressure of main gas jacket is kept lower than the internal pressure of the front and back gas jackets at the time of shielding.

In the shielding method for a bonding part in diffusion bonding under the fourteenth aspect of the present invention, it is preferable that the front gas jacket and/or the back gas jacket are comprises several blocks where the shielding gas is fed, and internal pressure of the block located closer to the main gas jacket is lower than those of the rest of blocks.

In the thirteenth aspect and fourteenth aspect of the present invention, the shielding is carried out as follows:

First, the shielding gas is supplied to the main gas jacket, the front gas jacket and the back gas jacket respectively. The shielding gas fed into each gas jacket leaks out of the gap created between the gas jackets and the materials. Since the shielding gas fed into the main gas jacket needs to go through the gaps created in the front and back gas jackets respectively before it goes out, it moves much slower than it does in the conventional gas jackets. In other words, the shielding gas fed into the main gas jacket stays there much longer than it does in the conventional gas jackets. Also, this prolonged stay in the main jacket allows the shielding gas in the main jacket to be heated with the heat generated during diffusion bonding. With these effects, the circumference of the bonding part is not cooled, and the degeneration in quality and strength in the joints is avoided. It means that the improvement of quality and strength of the joints is achieved.

BRIEF DESCRIPTION OF THE DRAWINGS

FIG. 16 is an oblique-view of the main construction of Embodiment 4 under the present invention showing only the mobile clamp while omitting others;

FIG. 17 is an oblique-view of the main construction of Embodiment 5 under the present invention showing only the mobile clamp while omitting others;

FIG. 18 is an oblique-view of the main construction of Embodiment 6 under the present invention showing only the mobile clamp while omitting others;

FIG. 39 is a front-view of the section of the major part of the heating coil under the Embodiment 18 of the present invention;

FIG. 46 (a) showing in the condition when a difference occurs in the joint, whereas FIG. 46 (b) showing the condition when a difference is corrected with a taper;.

DETAILED DESCRIPTION

Hereinafter, the present invention is described on the basis of embodiments with reference to the drawings attached hereto, however, the scope of the present invention is not limited to the embodiments.

Embodiment 1

Figure 1:
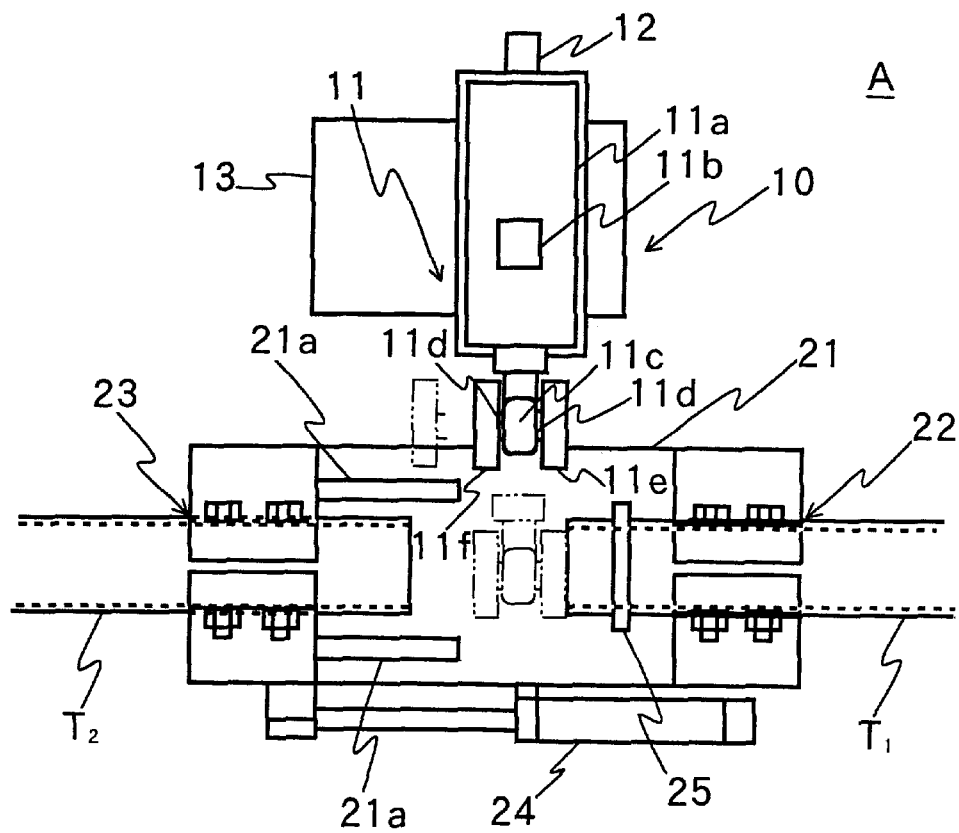
FIG. 1 is a plane illustrating the diffusion bonding apparatus employing the diffusion bonding method under the present invention.
Figure 2:
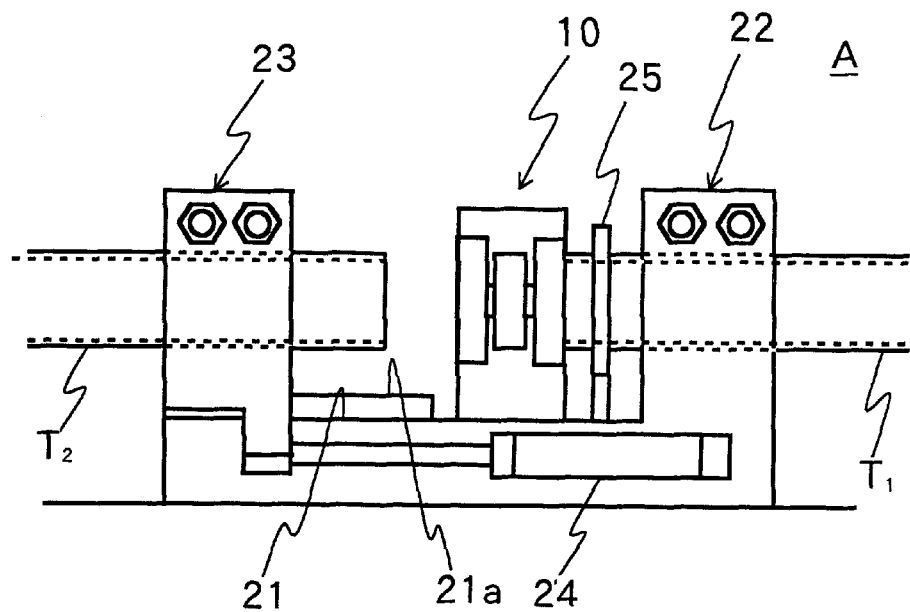
FIG. 2 is a side-view of the above.

FIG. 1 and FIG. 2 show Embodiment 1 of a diffusion bonding apparatus A employing the diffusion bonding method of the present invention. This diffusion bonding apparatus A of Embodiment 1 mainly consists of: a finishing means 10 to finish the ends of materials to be bonded, a bed 21, a fixed clamp 22 mounted on the bed 21, a mobile clamp 23 mounted on the bed 21 facing the fixed clamp 22, driving means 24 to move the mobile clamp 23, and an induction heating means 25 which is mobile and heats the ends of materials to be bonded.

The finishing means 10 comprises a machining component 11 to finish the ends of the materials, an electric motor (a first drive mechanism) 12 to move the machining component 11 forward and backward for the materials to be bonded, and a sideways slidable table (a second drive mechanism) 13 to move the electric motor 12 along a horizontal axis of the bed 21.

The machining component 11 concretely, comprises a main body 11a of the machining component 11 which is driven by the electric motor 12; a rotating head 11c which is rotated through a power transmission mechanism (not shown) of a motor 11b installed in the main body 11a of the machining component 11; a fixed side finishing means 11e, attached to the rotating head 11c through a supporter 11d, finishing the end of a tube T1 set in the fixed clamp 22, and a mobile side finishing means 11f, which is also attached to the rotating head 11c through the supporter lid finishing the end of a tube T2 set in the mobile clamp 23.

The fixed side finishing means 11e and the mobile side finishing means 11f are positioned symmetrically to the vertical axis of the rotating head 11c. Also, finishing means, both 11e and 11f are, for example, rotating elements with edges, and both edges of the finishing means 11e and 11f are in an aligned position so that the end of the material to be finished with the finishing means 11e and the end of the material to be finished with the finishing means 11f face parallel to each other.

Instead of edges, grindstones can be used.

The mobile clamp 23 moves forward and backward for the fixed clamp 22 being guided by guide-rails 21a and 21a which are laid along the horizontal axis of the bed 21.

The mobile clamp driving means 24 can be a hydraulic cylinder, for example, and is installed on one side as shown in FIG. 1. However, it can be installed on both sides of the mobile clamp 23.

The following describes diffusion bonding to be carried out with the diffusion bonding apparatus A of Embodiment 1 of the above construction.

Figure 3:
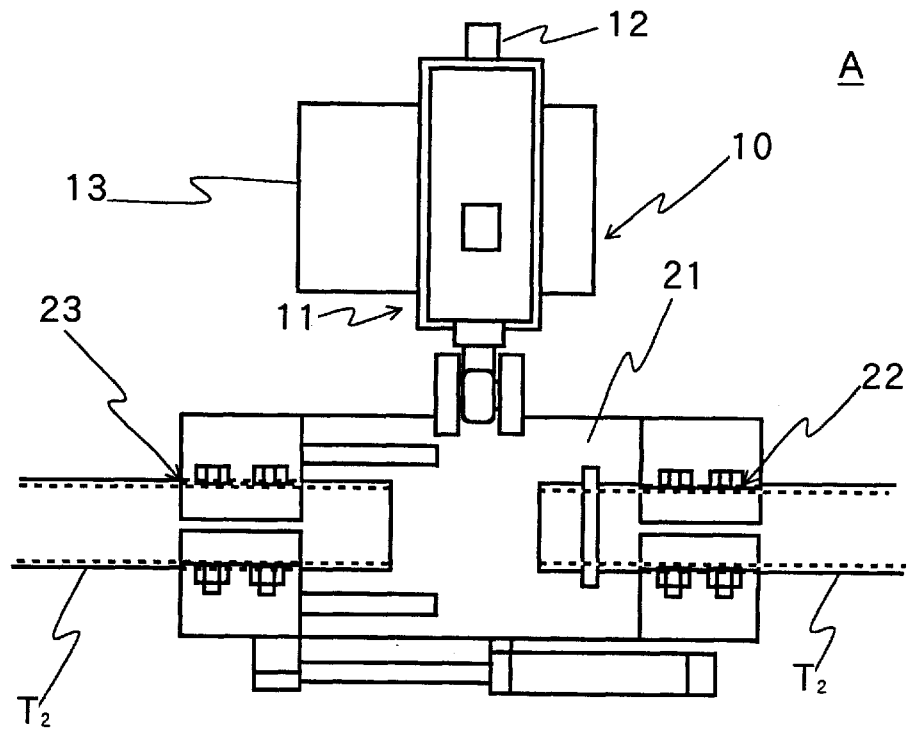
FIG. 3 is an explanatory illustration illustrating diffusion bonding carried out with the above diffusion bonding apparatus, specifically illustrating the condition when tubes are set in the clamps.
Figure 4:
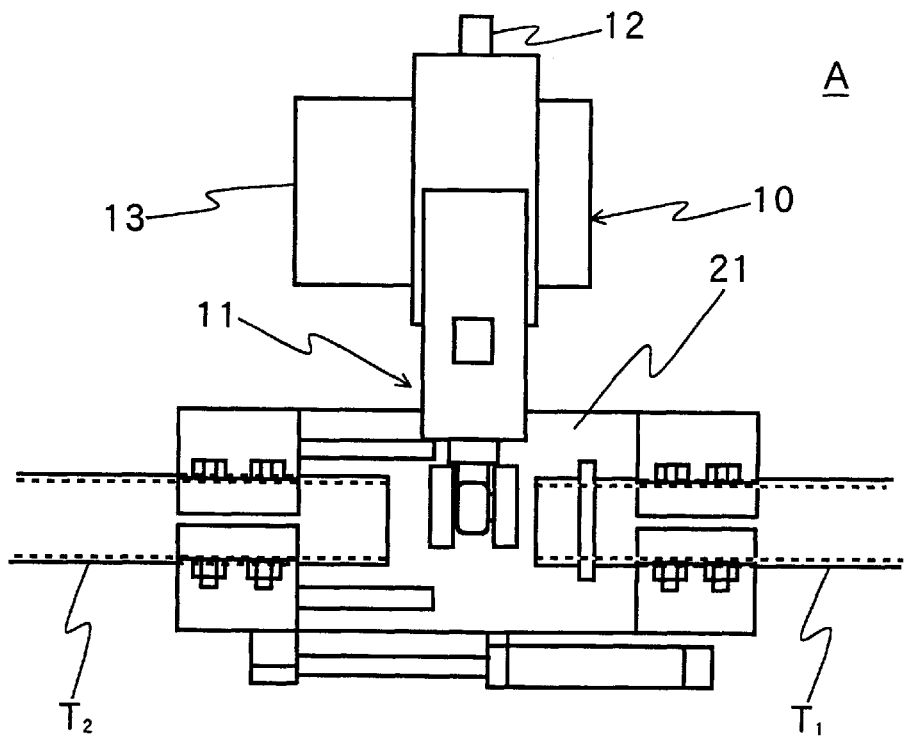
FIG. 4 is an explanatory illustration specifically illustrating the condition when the machining component reaches over the bed.
Figure 5:
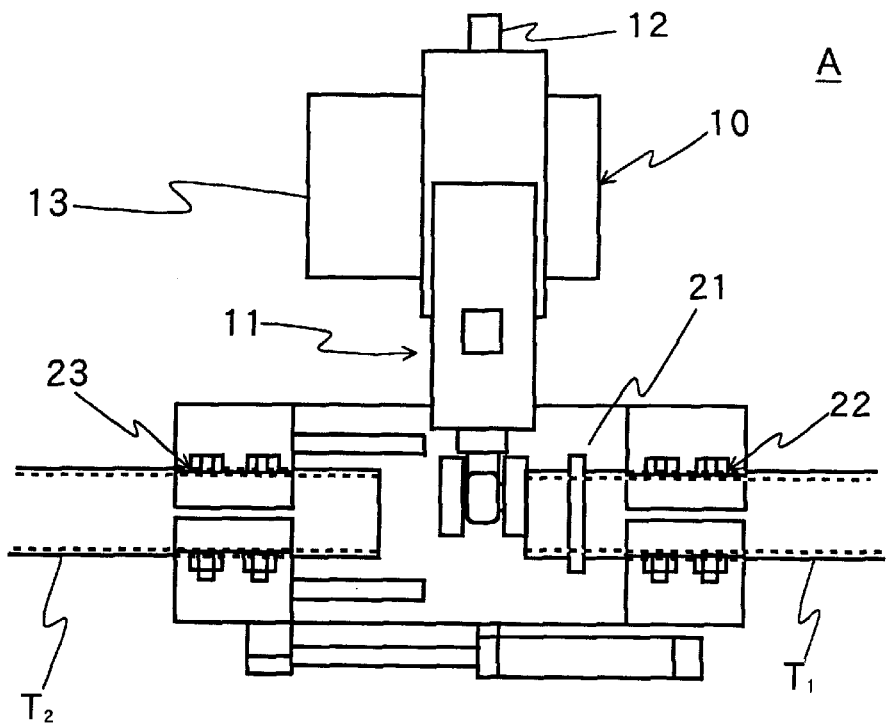
FIG. 5 is an explanatory illustration specifically illustrating the condition when the end of the tube clamped with the fixed clamp is being finished.
Figure 6:
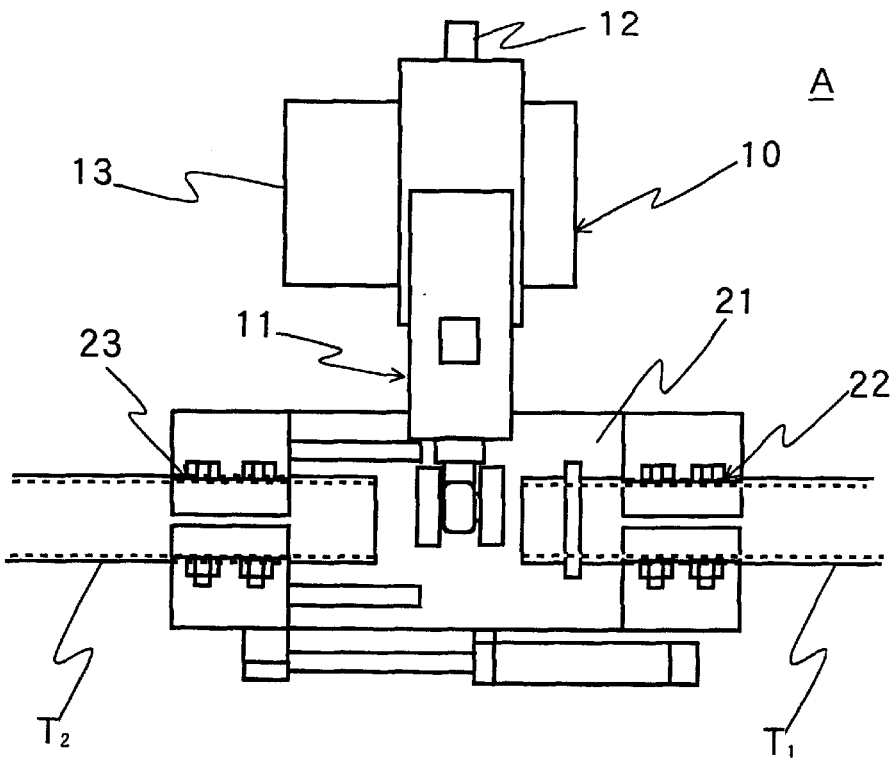
FIG. 6 is an explanatory illustration specifically illustrating the condition when the machining component is moving forward for the tube clamped with the mobile clamp.
Figure 7:
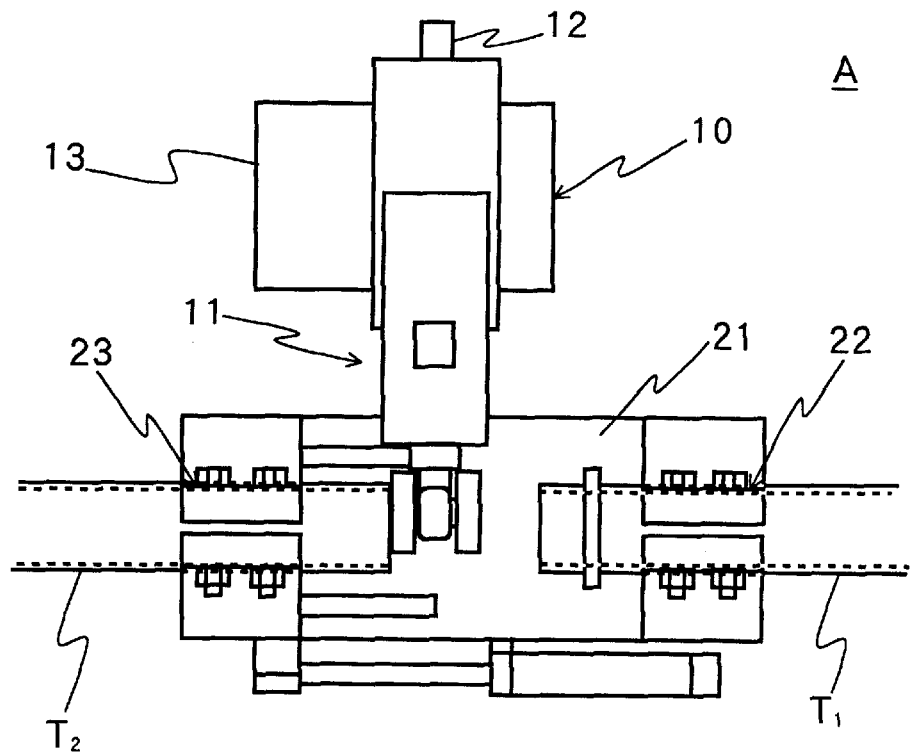
FIG. 7 is an explanatory illustration specifically illustrating the condition when the end of the tube clamped with the mobile clamp is being finished.
Figure 9:
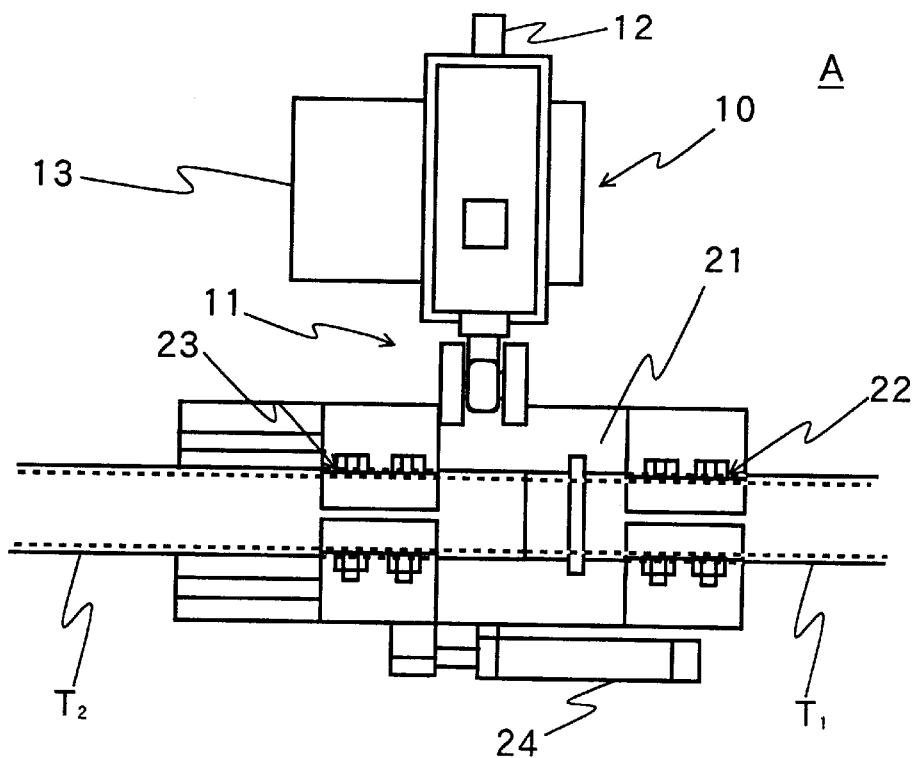
FIG. 9 is an explanatory illustration specifically illustrating the condition when both ends of the tubes are in contact.
Figure 10:
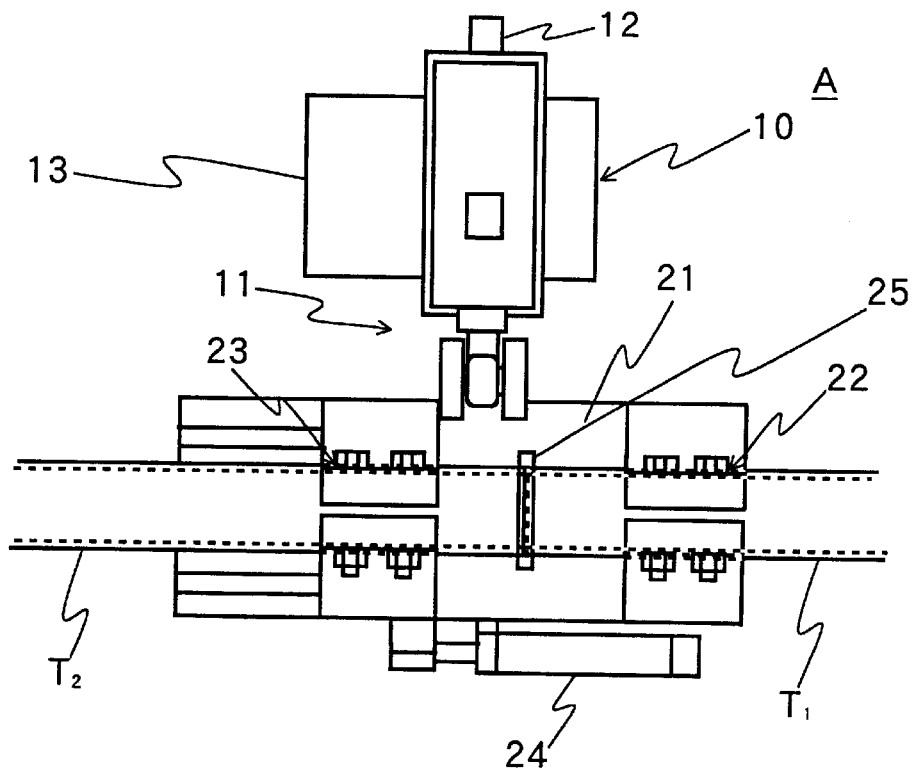
FIG. 10 is an explanatory illustration specifically illustrating the condition when the joint of two tubes is being heated and pressurized.

1. Loosen bolts and nuts which tighten the fixed clamp 22 and the mobile clamp 23, and insert tubes T1 and T2 over the bed 21 until the ends of both tubes reach their specified positions. (refer to FIG. 3)
2. Tighten bolts and nuts to clamp the tubes T1 and T2.
3. Drive the first driving mechanism 12 until the machining component 11 reaches a specified position in the over the bed 21. (refer to FIG. 4)
4. While moving the fixed side finishing means 11e, move the second driving mechanism 13 until the edge contacts the end of the tube T1 clamped with the fixed clamp 22, and finish the end while driving the first driving mechanism 12 in an appropriate manner. (refer to FIG. 5)
5. Upon completion of the finishing work of the end of the tube T1 clamped with the fixed clamp 22, drive the second driving mechanism 13 and move the machining component 11 forward the tube T2 clamped with the mobile clamp 23. (refer to FIG. 6)
6. Stop the fixed side finishing means 11e, move the mobile side finishing means 11f until its edge contacts the end of the tube T2 clamped with the mobile clamp 23, and finish the end while driving the first driving mechanism 12 in an appropriate manner. (refer to FIG. 7)
7. Upon completion of the finishing work of the end of the tube T2 clamped with the mobile clamp 23, drive the second driving mechanism 13 to move the machining component 11 backward for the tube T2 clamped with the mobile clamp 23. Now, the ends of the tubes T1 and T2 reach the stage where they face parallel to each other as desired.
8. Drive the first driving mechanism 12 to move the machining component 11 backward for the bed 21, and stop the mobile side finishing means 11f. (refer to FIG. 8)
9. With the mobile clamp driving means 24, move the end of the tube T1 to contact with the end of the tube T2 and apply pressure to the joint. (refer to FIG. 9) When doing this, place an insert between the tubes T1 and T2, if necessary.
10. Move the mobile induction heating means 25 to the joint of the tubes T1 and T2, and heat the joint of the tubes T1 and T2. (refer to FIG. 10)
11. Upon completion of diffusion bonding, loosen the fixed clamp 22 and the mobile clamp 23, and pull out the bonded tube T from the clamps 22 and 23.

As shown above, the bonding work under this Embodiment 1 only requires to insert the tube T into the clamps 22 and 23, thus allowing a substantially easier and quicker setting of the tube T in the diffusion bonding apparatus A.

Embodiment 2

Figure 11:
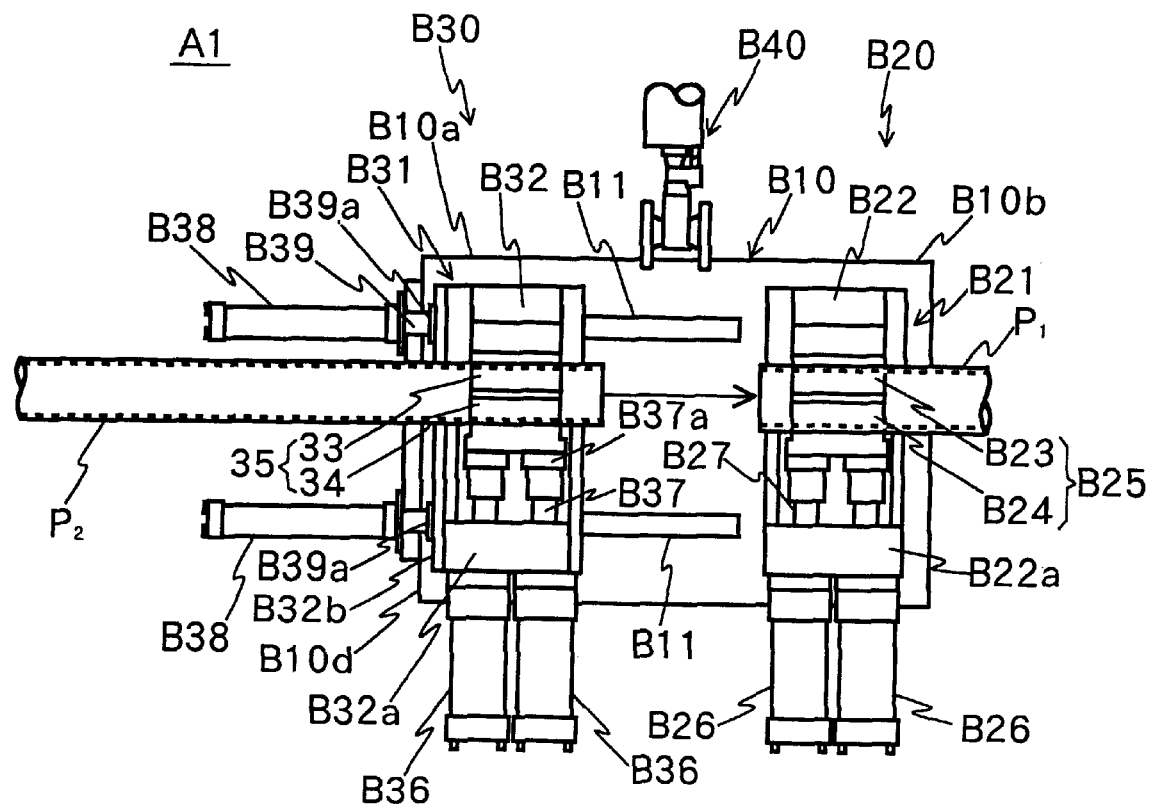
FIG. 11 is a plane of Embodiment 2 under the present invention.
Figure 12:
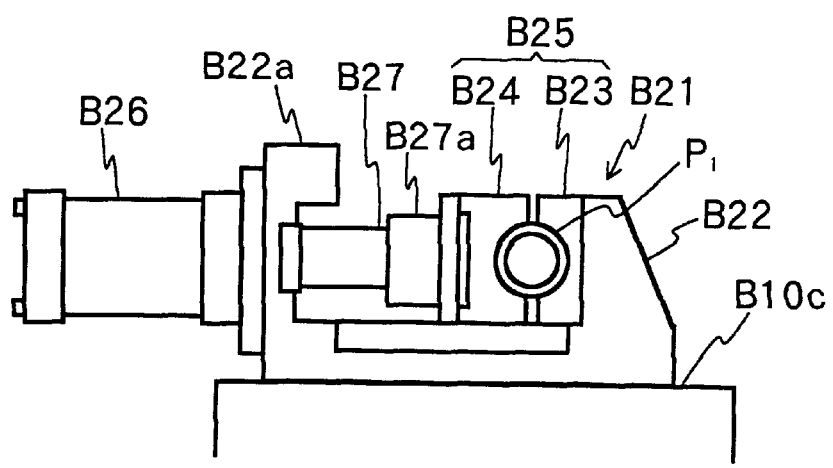
FIG. 12 is a side-view of the above Embodiment 2.

FIG. 11 and FIG. 12 show a diffusion bonding apparatus A1 pertinent to Embodiment 2 under the present invention. The diffusion bonding apparatus A1 of Embodiment 2 mainly consists of a bed B10, a fixed clamp B21 fixed on the one side (the discharging side) B10b of the bed B10, and a mobile clamp B31 fixed on the other side (the feeding side) B10a of the bed B10 which faces the fixed clamp B21 and moves backward and forward. With this mobile clamp B31 as a center, a material feeding section B30 is constructed, whereas with this fixed clamp B21 as a center, a material discharging section B20 is constructed.

The fixed clamp B21 concretely comprises a main clamping body B22 fixed on the upper side B10c of the bed B10, a clamping section B25 comprising a fixed block pawl B23 and a mobile block pawl B24 which clamps the material P1 in a joint action with the fixed block pawl B23, and pawl driving hydraulic cylinders B26 and B26, horizontally mounted on a fixture B22a of the main clamping body B22 in two rows, to drive the mobile block pawl B24; and the fore-end B27a of piston-rod B27 of the pawl driving hydraulic cylinder B26 is connected to the back of the mobile block pawl B24. Along with the movement of the piston-rod B27 of the pawl driving hydraulic cylinder B26, the mobile block pawl B24 moves forward and backward for the fixed block pawl B23.

The mobile clamp B31 concretely comprises a main clamping body B32 which runs on a pair of rails B11 and B11 installed on the upper side B10c of the bed B10 in the direction of the mobile clamp B21, main body driving hydraulic cylinders B38 and B38 which are mounted on the fore-end of the bed B10 (the end where the material is fed from) and which move the main clamping body B32 on the pair of rails B11 and B11 and pressurize the material P2 at a predetermined pressure, a clamping section B35 comprising a fixed block pawl B33 fixed on the main clamping body B32 and a mobile block pawl B34 which clamps the material P2 in a joint action with the mobile block pawl B34, and pawl driving hydraulic cylinders B36 and B36, horizontally mounted on a fixture 32a of the main body B32 in two rows, to drive the mobile block pawl B34; and the top B39a of a piston-rod B39 of the main body driving hydraulic cylinder B38 is connected to the fore-front (the side where the material is fed in) of the main clamping body B32, whereas the fore-end B37a of piston-rod B37 of the pawl driving hydraulic cylinder B36 is connected to the back of the mobile block pawl B34. Along with the movement of the piston-rod B39 of the main body driving hydraulic cylinder B38, the main clamping body B32 runs on the rails B11 and B11 forward and backward for the fixed clamp B21. Also, along with the movement of the piston-rod B37 of the pawl driving hydraulic cylinder B36, the mobile block pawl B34 moves forward and moves backward for the fixed block pawl B33.

Figure 13A:
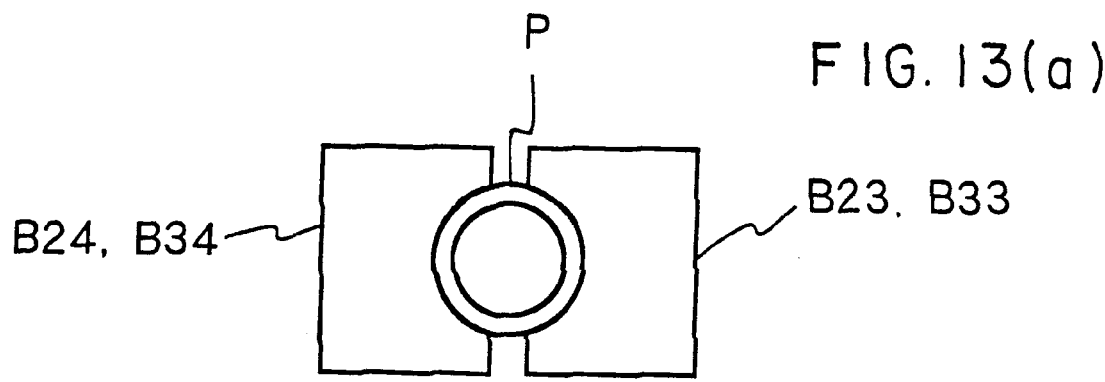
FIG. 13 is an explanatory illustration illustrating the shapes of block pawls to be used in the Embodiment 2.
Figure 13B:
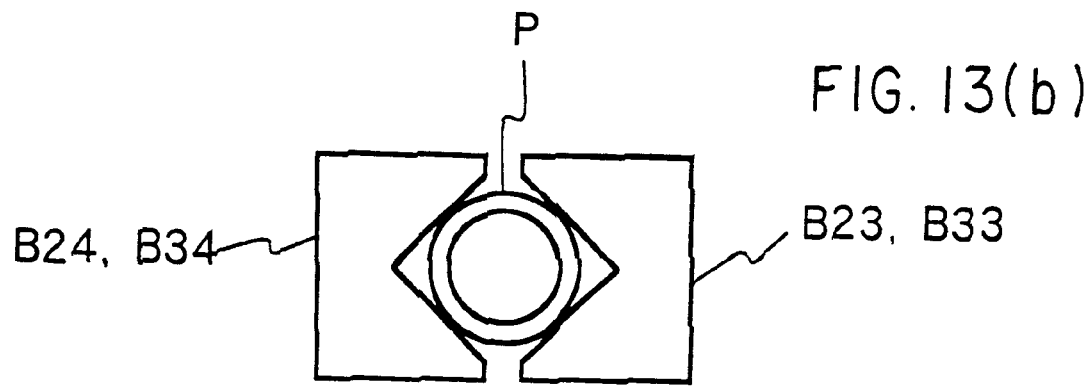
Figure 13C:
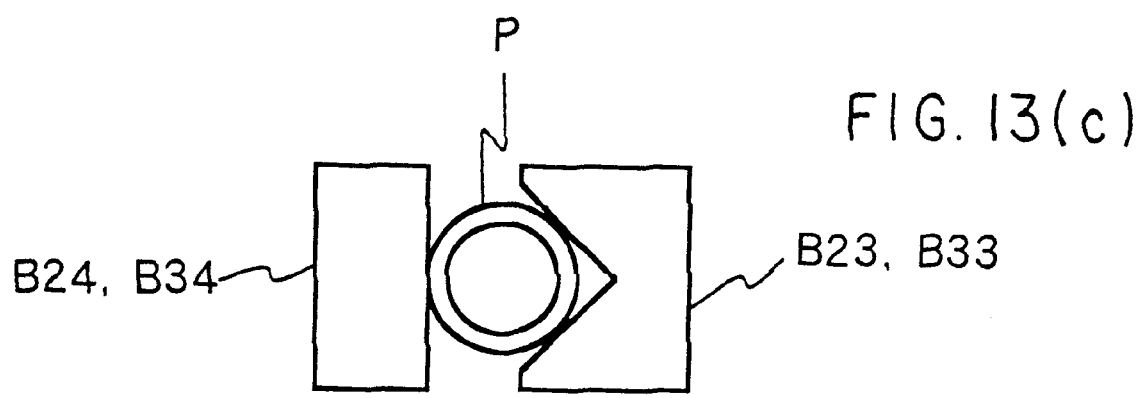

Numeral B40 in FIG. 11 represents a finishing device to finish the ends of the materials P1 and P2. The shape of the mobile block pawls B23 and B33 and the fixed block pawls B24 and B34 can be one of those shown in FIG. 13 with the mark (a), (b), or (c).

The following describes the operation of the diffusion bonding apparatus A1 of Embodiment 2 of the above construction supposing that the material P1 is being clamped with the fixed clamp B21.

1. Move backward the piston-rod B37 of the pawl driving hydraulic cylinder B36 of the mobile clamp B31 to move backward the mobile block pawl B34, and open the clamping section B35.

2. Push the material P2 through the clamping section B35 towards the fixed clamp B21 to a certain extent, and set it in the clamping section B35.

3. Move forward the piston-rod B37 of the pawl driving hydraulic cylinder B36 of the mobile clamp B31 to move forward the block mobile pawl B34, and close the clamping section B35. After this, the material P2 is clamped with the mobile clamp B31.

4. Move forward the piston-rod B39 of the main body driving hydraulic cylinder B38 until the fore-end of the material P2 clamped with the mobile clamp B31 contacts the back-end of the material P1 clamped with the fixed clamp B21.

5. Increase pressure of the main body driving hydraulic cylinder B38 to a predetermined pressure, and apply pressure to the bonding part of the materials P1 and P2.

6. Apply heat at a predetermined temperature to the bonding part of the materials P1 and P2, and bond the materials P1 and P2.

7. Move backward the piston-rod B27 of the pawl driving hydraulic cylinder B26 of the fixed clamp B21 to move backward the mobile block pawl B24, and open the clamping section B25.

8. With a discharge device (illustration omitted), discharge the material P2 through the clamping section B25 until its back-end remains out of the clamping section B25 of the fixed clamp B21 by a predetermined length.

9. Move forward the piston-rod B27 of the pawl driving hydraulic cylinder B26 of the fixed clamp B21 to move forward the mobile block pawl B24, and close the clamping section B25. After this, the material P2 is clamped with the fixed clamp B21.

The above procedures 1 through 9 are repeated until the pipe's desired length is attained.

As described above, according to the Embodiment 2, a pipe of any desired length can be manufactured by diffusion bonding.

Embodiment 3

Figure 14:
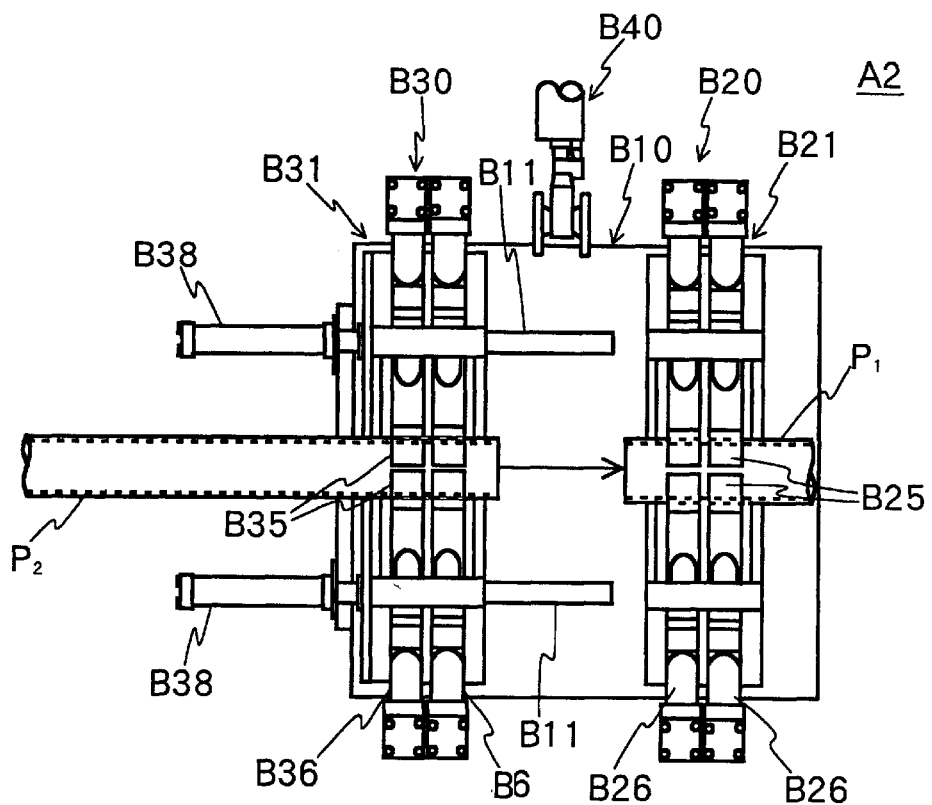
FIG. 14 is a plane of Embodiment 3 munder the present invention.
Figure 15:
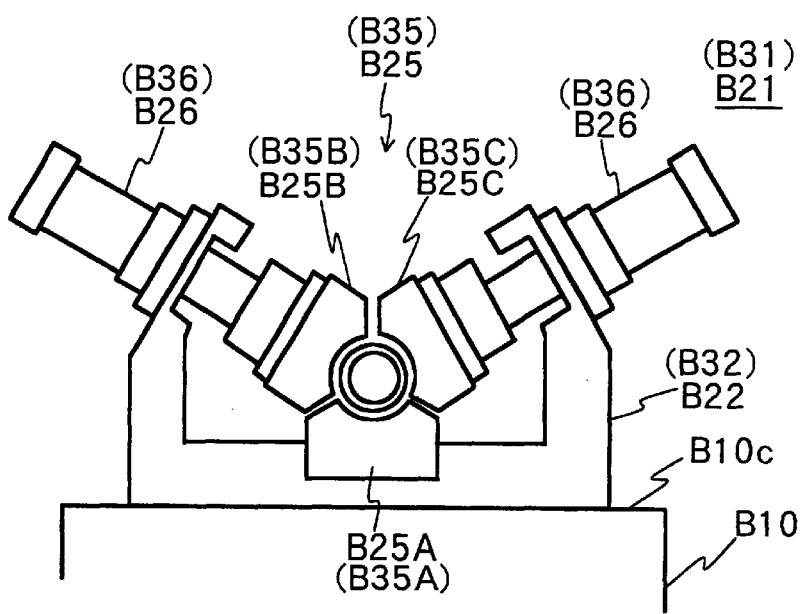
FIG. 15 is a side-view of the above Embodiment 3.

FIG. 14 and FIG. 15 show a diffusion bonding apparatus A2 pertinent to Embodiment 3 under the present invention. This Embodiment 3 is a modification of Embodiment 2 having a clamping section B25 (B35) comprising the first block pawl B25A (B35A), the second block pawl B25B (B35B), and the third block pawl B25C (B35C). The first block pawl B25A (B35A) is fixed on the bottom of the main clamping body B22 (B32), while the second block pawl B25B (B35B) and the third block pawl B25C (B35C) are driven with a pawl driving hydraulic cylinder B26 (B36). The second block pawl B25B (B35B) with its pawl driving hydraulic cylinder B26 (B36) and the third block pawl B25C (B35C) with its pawl driving hydraulic cylinder B26 (B36) form an angle of 120 or 90 degrees. (refer to FIG. 15)

Except for the above, the construction and the operation of Embodiment 3 is the same as those of Embodiment 2.

In Embodiment 3 of the above construction and operation, a pipe or other product of a specified length is manufactured by diffusion bonding in the same way as Embodiment 2. In addition, owing to the clamping section B25 (B35) comprising the first, the second, and the third block pawls B25A (B35A), B25B (B35B), and B25C (B35C) respectively, and to the pawl driving hydraulic cylinders B26, B26 (B36, B36) mounted on the pawls in a slant direction, although materials P1 (P2) can be clamped uniformly in the diffusion bonding apparatus A2, the width of Embodiment 3 is smaller than that of Embodiment 2. The effect is not obtained by Embodiment 2.

Embodiment 4

FIG. 16 shows the major section of a diffusion bonding apparatus A3 pertinent to Embodiment 4 under the present invention. This Embodiment 4 is a modification of Embodiment 2 having a clamp comprising a main clamping body B22 (B32) and a clamping section B25 (B35) comprising a right block pawl B24A (B34A) and a left block pawl B24B (B34B) which freely slide on the main clamping body B22 (B32). In Embodiment 4, the material P1 (P2) is clamped by opening and closing the right block pawl B24A (B34A) and the left block pawl B24B (B34B) with the pawl driving hydraulic cylinders B26, B26 (B36, B36) which face to each other with the right block pawl B24A (B34A) and the left block pawl B24B (B34B) between them. For the mobile clamp B31, the top of the piston-rod B39a of mobile clamp driving hydraulic cylinder is connected to a connector B321 installed on the back of the front part of the main clamping body B32. Although FIG. 16 shows that the apparatus has one mobile clamp driving hydraulic cylinder B38, it can have two hydraulic cylinders as is described in Embodiment 2.

Except for the above, the construction of Embodiment 4 is the same as those of Embodiment 2.

The following describes the operation of the diffusion bonding apparatus A3 of the Embodiment 4 the above construction supposing that the material P1 is being clamped with the fixed clamp B21.

1. Move backward the piston-rods B37 and B37 of the pawl driving hydraulic cylinders B36 and B36 for the right block pawl B34A and the left block pawl B34B of the mobile clamp B31 to move backward the both block pawls B34A and B34B, and open the clamping section B35.

2. Push the material P2 through the clamping section B35 towards the fixed clamp B21 to a certain extent, and set it in the clamping section B35.

3. Move forward the piston-rods B37 and B37 of the pawl driving hydraulic cylinders B36 and B36 for the block pawls B34A and B34B of the mobile clamp B31 to move forward the both block pawls B34A and B34B, and close the clamping section B35. After this, the material P2 is clamped with the mobile clamp B31.

4. Move forward the piston-rod B37 of the main body driving hydraulic cylinder B38 to make the fore-end of the material P2 clamped with the mobile clamp B31 contact the back-end of the material P1 clamped with the fixed clamp B21.

5. Increase pressure of the main body driving hydraulic cylinder B38 to a predetermined pressure, and apply pressure to the bonding part of the materials P1 and P2.

6. Apply heat at a predetermined temperature to the bonding part of the materials P1 and P2, and bond the materials P1 and P2.

7. Move backward the piston-rods B27 and B27 of the pawl driving hydraulic cylinders B26 and B26 of the right block pawl B24A and the left block pawl B24B of the fixed clamp B21 to move backward the both block pawls B24A and B24B, and open the clamping section B25.

8. Discharge the material P2 with the discharging device (illustration omitted) until its back-end remains out of the clamping section B25 of the fixed clamp B21 by a predetermined length.

9. Move forward the piston-rods B27 and B27 of the pawl driving hydraulic cylinders B26 and B26 of the fixed clamp B21 to move forward the both block pawls B24A and B24B, and close the clamping section B25. After this, the material P2 is clamped with the fixed clamp B21.

The procedures 1 through 9 are repeated until the pipe's desired length is attained.

Embodiment 5

FIG. 17 shows the main section of a diffusion bonding apparatus A4 pertinent to Embodiment 5 under the present invention. This Embodiment 5 is a modification of Embodiment 2 employing a mechanism B25D (B35D) similar to the mechanism employed for the chuck of lathe in its clamping section B25 (B35).

Except for the above, the structure of Embodiment 5 is the same as those of Embodiment 4. Its operation is also the same as that of Embodiment 4 except for the operation of the clamping section B25 (B35).

Embodiment 6

Figure 8:
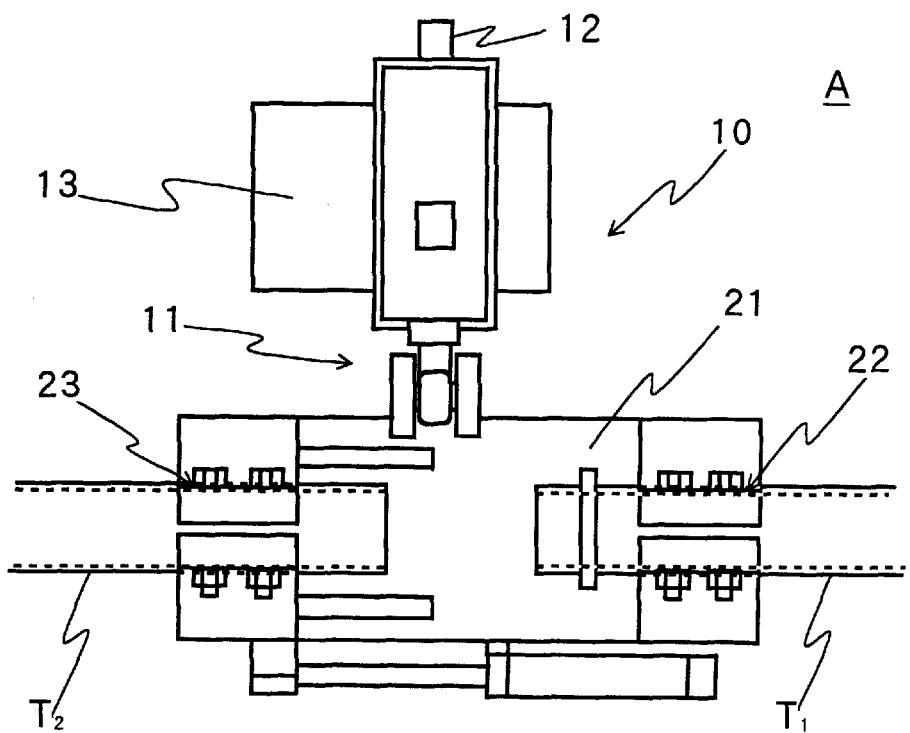
FIG. 8 is an explanatory illustration specifically illustrating the condition when the processing component is moving backward for the bed.

FIG. 8 shows the main section of a diffusion bonding apparatus A5 pertinent to Embodiment 6 under the present invention. This Embodiment 6 is a modification of Embodiment 2 having a guiding means B50 to guide the material P2 instead of the mobile clamp B31 and a feeding and pressurizing means B60 which feeds and pressurizes the material P2. The guiding means B50 comprises a pair of the guiding mechanisms B51 and B51 of the identical construction installed side by side. This guiding mechanism B51 comprises a main guiding body B52, and the guiding section B53 having a right guiding component B53A and a left guiding component B53B both of which slide freely on the main guiding body B52. By opening and closing the guiding components B53A and B53B with guiding component driving hydraulic cylinders B55 and B55 which are installed to face each other with the guiding components B53A and B53B, the material P2 is slidably guided.

The feeding and pressurizing means B60 is concretely a hydraulic cylinder (for feeding and pressurizing) B61 having a feeding and pressurizing component B63 in a disc shape mounted on the fore-end of the piston-rod B62. When the piston-rod B62 moves forward while the feeding and pressurizing component B63 is in contact with the back-end of the material P2, the material P2 can be fed and pressurized.

Except for the above, the construction of all other parts including the fixed clamp B21 of Embodiment 6 is the same as those of Embodiment 2.

The following describes the operation of a diffusion bonding apparatus A5 of Embodiment 6 of the above construction supposing that the material P1 is being clamped with the fixed clamp B21.

1. Move backward the piston-rods B56 and B56 of the guiding component driving hydraulic cylinders B55 and B55 for the right guiding component B53A and the left guiding component B53B of the guiding mechanism B51 and B51 respectively to move backward the guiding components B53A and B53B, and open the guiding section B54.
2. Set the material P2 in the guiding section B54.
3. Move forward the piston-rods B56 and B56 for the guiding component driving hydraulic cylinders B55 and B55 of the two guiding components to move forward both guiding components B53A and B53B, and close the guiding section B54. With this, the material P2 can be guided by the guiding mechanisms B51 and B51.
4. Move forward the piston-rod B62 of the feeding and pressurizing hydraulic cylinder B61 to move forward the material P2 being guided by the guiding mechanisms B51 and B51, and make the fore-end of the material P2 contact with the back-end of the material P1 clamped with the fixed clamp B21.
5. Increase the pressure of the feeding and pressurizing hydraulic cylinder B61 to a predetermined pressure, and pressurize the bonding part of the materials P1 and P2 at the predetermined pressure.
6. Heat the bonding part of the materials P1 and P2 at a predetermined temperature, and bond the materials P1 and P2.
7. Move backward the piston-rods B27 and B27 of the pawl driving hydraulic cylinders B26 and B26 of the fixed clamp B21 to move backward the mobile block pawl B24, and open the clamping section B25.
8. With a discharging device (illustration omitted), discharge the material P2 until the back-end of the material remains out of the clamping section B25 of the fixed clamp B21 by a specified length.
9. Move forward the piston-rods B27 and B27 of the pawl driving hydraulic cylinders B26 and B26 of the fixed clamp B21 to move forward the mobile block pawl B24, and close the clamping section B25. After this, the material P2 is clamped with the fixed clamp B21.

The procedures 1 through 9 are repeated until the pipe's desired length is attained.

Embodiment 7

Figure 19:
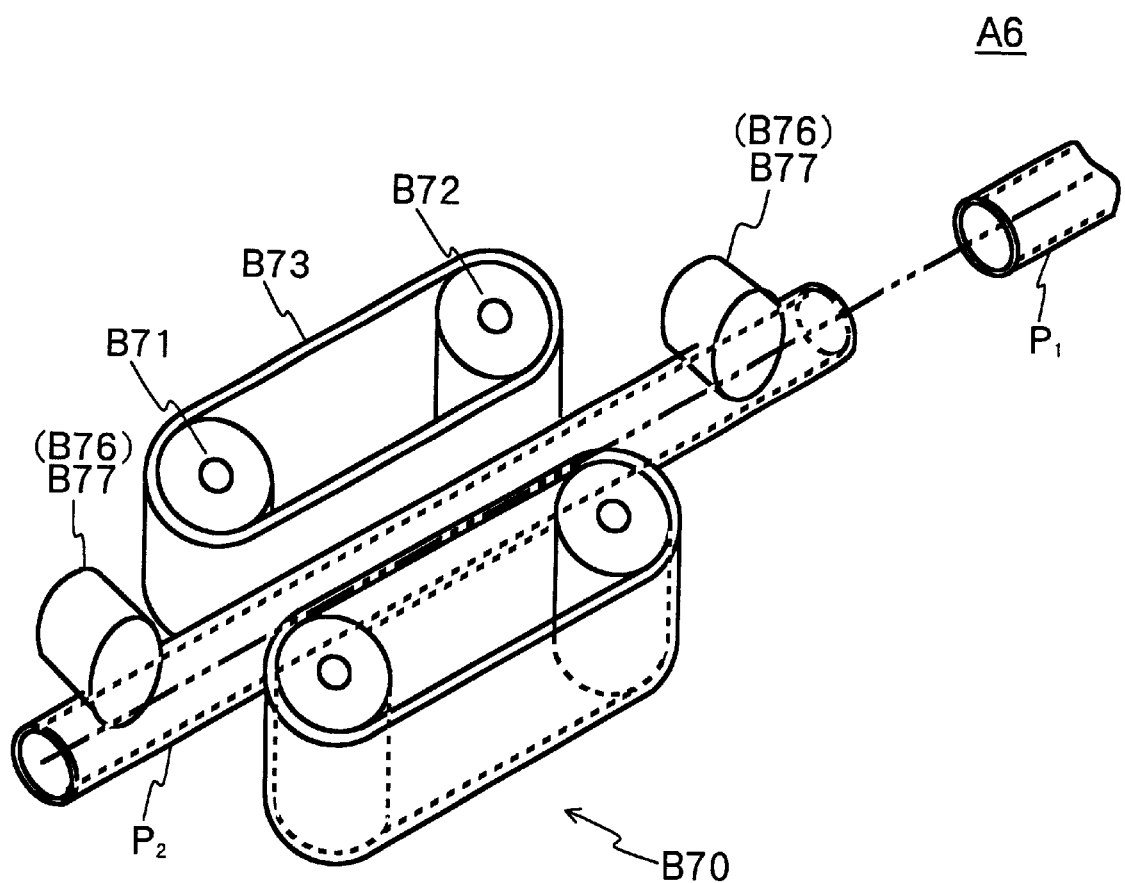
FIG. 19 is an oblique-view of the main construction of Embodiment 7 under the present invention showing only the mobile clamp while omitting others.

FIG. 19 shows the main section of a diffusion bonding apparatus A6 pertinent to Embodiment 7 under the present invention. This Embodiment 7 is a modification of Embodiment 2 having a guiding-and-feeding/pressurizing means B70 for the material P2 instead of the mobile clamp B31 and a preventing means B76 to prevent the material P2 from moving upward.

The guiding-and-feeding/pressurizing means B70 concretely comprising a driving roller B71 and a driven roller B72 set positioned in a specified interval and tied up with a feeding/pressurizing belt B73 carrying specified friction and another set of the same, both of which are installed to face each other. These two feed the material P2 while holding it, and then pressurize it.

The preventing means B76 to prevent the material from moving upward concretely comprises two rollers B77 and B77 which are positioned on the fore-side and back-side of the guiding-and-feeding/pressurizing means B70 respectively, and contact the surface of the material P2.

The following describes the above operation of the diffusion bonding apparatus A6 of Embodiment 7 of the above construction supposing that the material P1 is being clamped with the fixed clamp B21.

1. While preventing the material P2 with the preventing means B76 from moving upward and guiding with the guiding-and-feeding/pressurizing means B70, deliver the material with the guiding-and-feeding/pressurizing means B70 until its fore-end contacts the back-end of the material P1 clamped with the fixed clamp B21.
2. While driving the guiding-and-feeding/pressurizing means B70, pressurize the contacting part of the materials P1 and P2 with a predetermined pressure.
3. Heat the bonding part of the materials P1 and P2 at a predetermined temperature, and bond the materials P1 and P2.
4. Move backward the piston-rods B27 and B27 of the pawl driving hydraulic cylinders B26 and B26 of the fixed clamp B21 to move backward the mobile block pawl B24, and open the clamping section B25.

5. With a discharging device (illustration omitted), discharge the material P2 from the clamping section B25 of the fixed clamp B21 until its back-end stays out of the clamping section B25 by a specified length.
6. Move forward the piston-rods B27 and B27 of the pawl driving hydraulic cylinders B26 and B26 of the fixed clamp B21 to move forward the mobile block pawl B24, and close the clamping section B24. After this, the material P2 is clamped with the fixed clamp B21.

The above procedures 1 through 6 are repeated until the pipe's desired length is attained.

Embodiment 8

Figure 20:
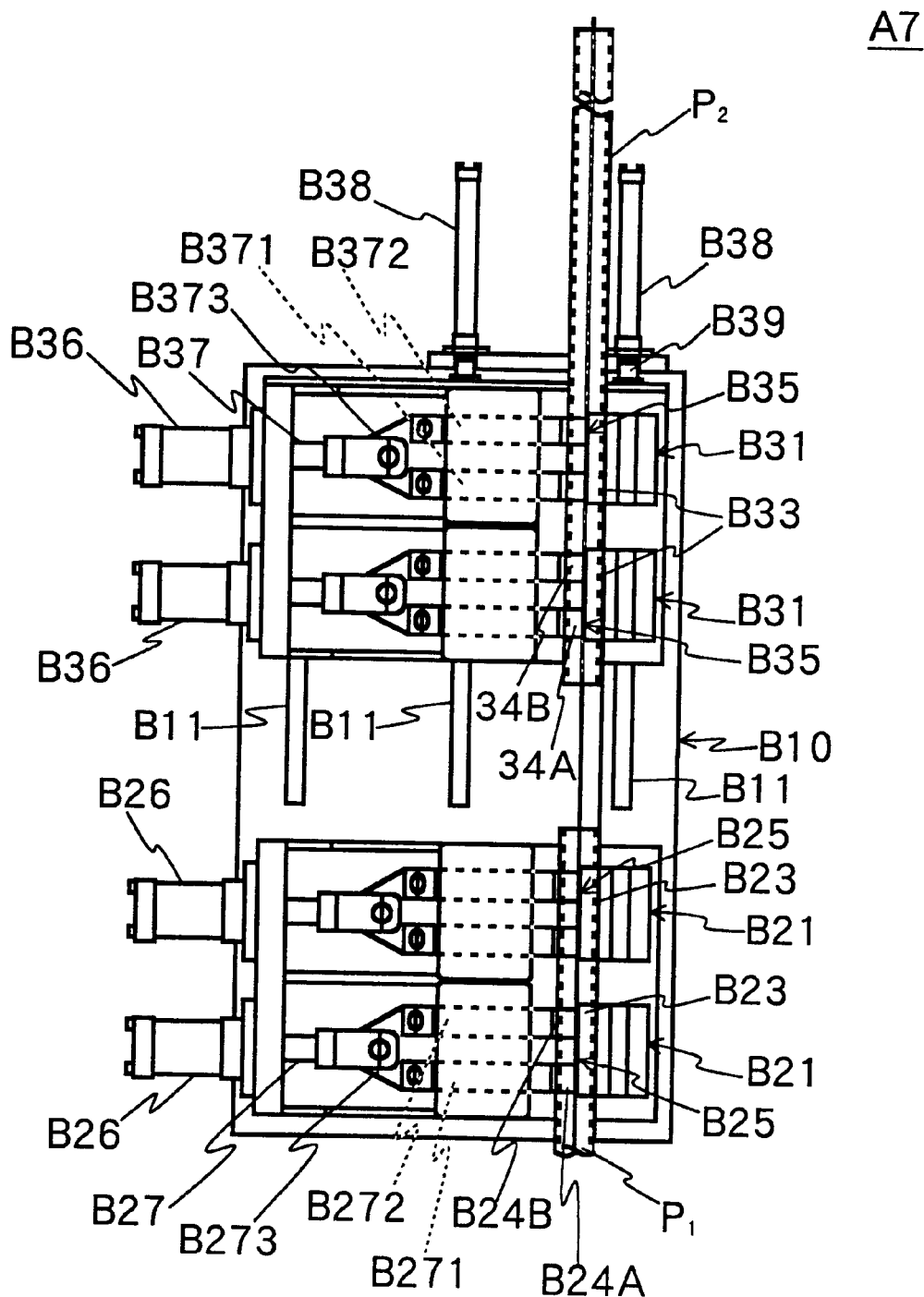
FIG. 20 is a plane of Embodiment 8 under the present invention.
Figure 21:
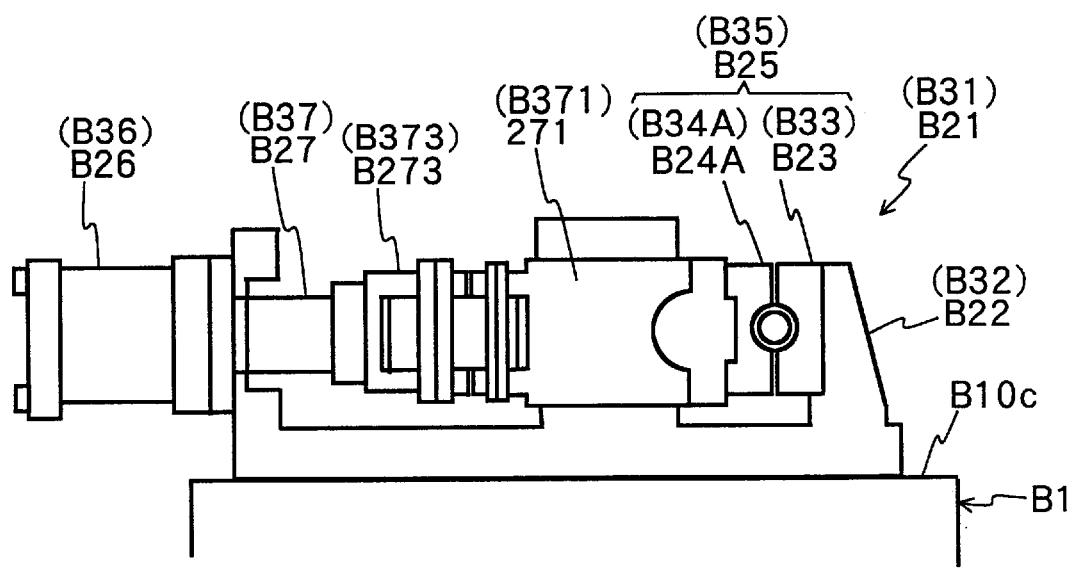
FIG. 21 is a side-view of the Embodiment 8.

FIG. 20 and FIG. 21 show a diffusion bonding apparatus A7 pertinent to Embodiment 8 under the present invention. This Embodiment 8 is a modification of Embodiment 2 having a pair of fixed clamps B21 and a pair of mobile clamps B31, which are driven with the hydraulic cylinders B26, B26, B26 and B26.

To be more specific, the clamp B21 (B31) comprises a main clamping body B22 (B32); a clamping section B25 (B35) comprising a fixed wide block pawl B23 (B33) fixed on the main clamping body B22 (B32), a front-part mobile block pawl B24A (B34A) to clamp the material P1 (P2) together with the front-part of the fixed wide block pawl B23 (B33), and a rear-part mobile block pawl B24B (B34B) to clamp the material P1 (P2) together with the rear-part of the fixed wide block pawl B23 (B33); a front-part driving rod B271 (B371) connected to the back of the front-part mobile block pawl B24A (B34A); a rear-part driving rod B272 (B372) connected to the rear-part mobile block pawl B24B (B34B); a connecting component B273 (B373) which connects the back-end of the front-part driving rod B271 (B371) and the back-end of the rear-part driving rod B272 (B372); and the rod driving hydraulic cylinder B26 (B36) of which piston-rod B27 (B37) is connected to the connecting component B273 (B373).

Except for the above, the construction and the operation of Embodiment 8 is the same as those of Embodiment 2.

Embodiment 9

Figure 22:
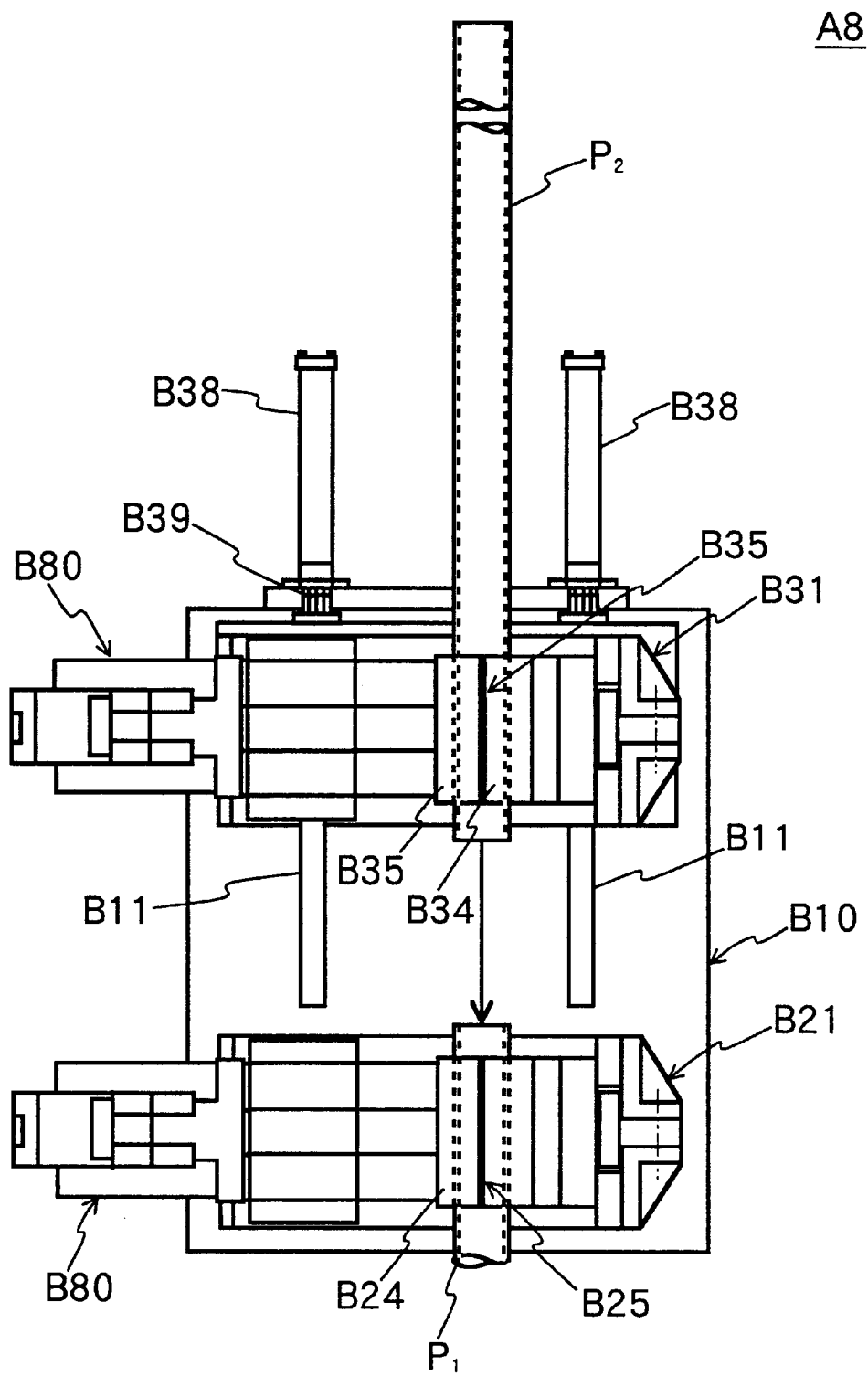
FIG. 22 is a plane of Embodiment 9 under the present invention.
Figure 23:
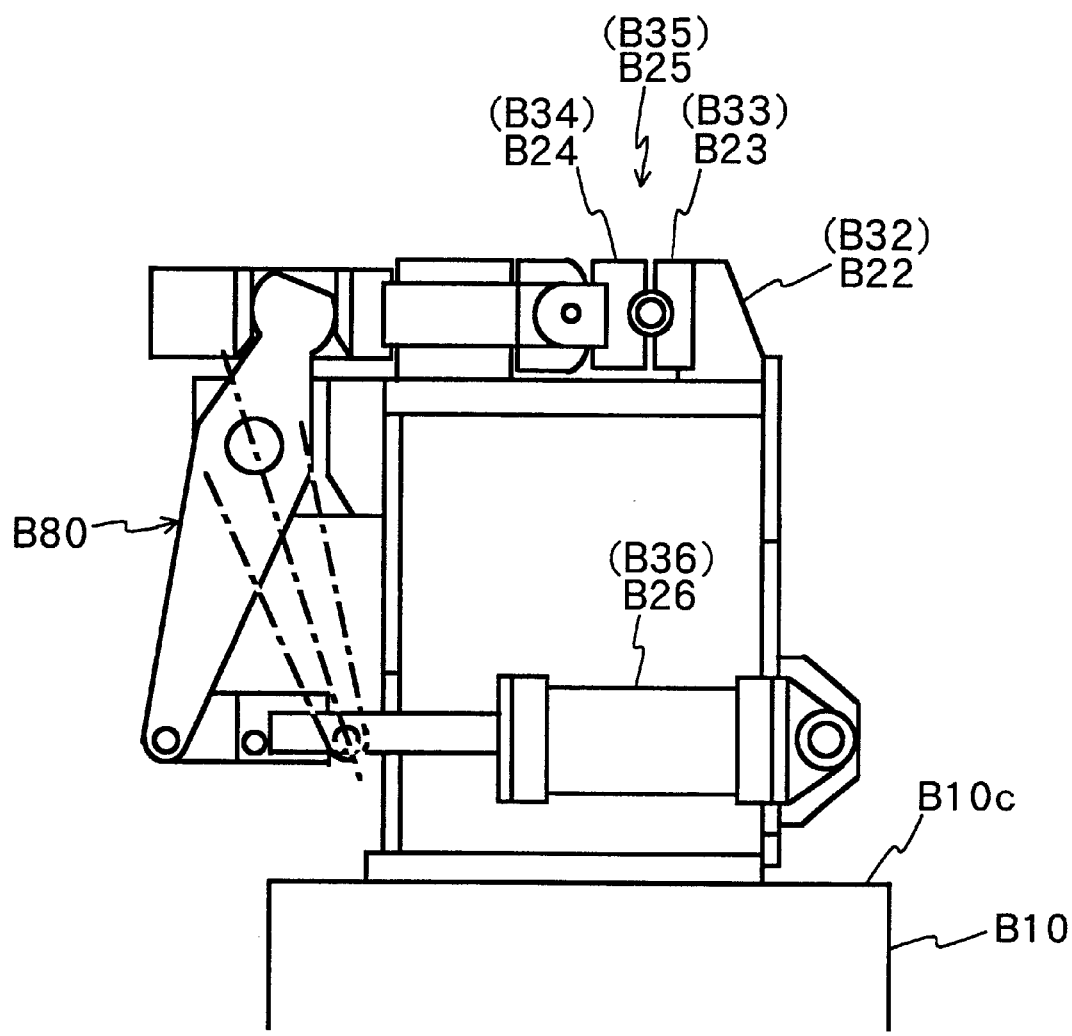
FIG. 23 is a side-view of the Embodiment 9.

FIG. 22 and FIG. 23 show a diffusion bonding apparatus A8 pertinent to Embodiment 9 under the present invention. This Embodiment 9 is a modification of Embodiment 2 having a construction wherein the pawl driving hydraulic cylinder B26 (B36) for the mobile block pawl B24 (B34) is installed in the lower part of the clamping section B25 (B35) of the box-shaped main clamping body B22 (B32), and the mobile block pawl B24 (B34) is driven through the linking mechanism B80.

Except for the above, the construction and the operation of Embodiment 9 is the same as those of Embodiment 2.

Embodiment 10

Figure 24:
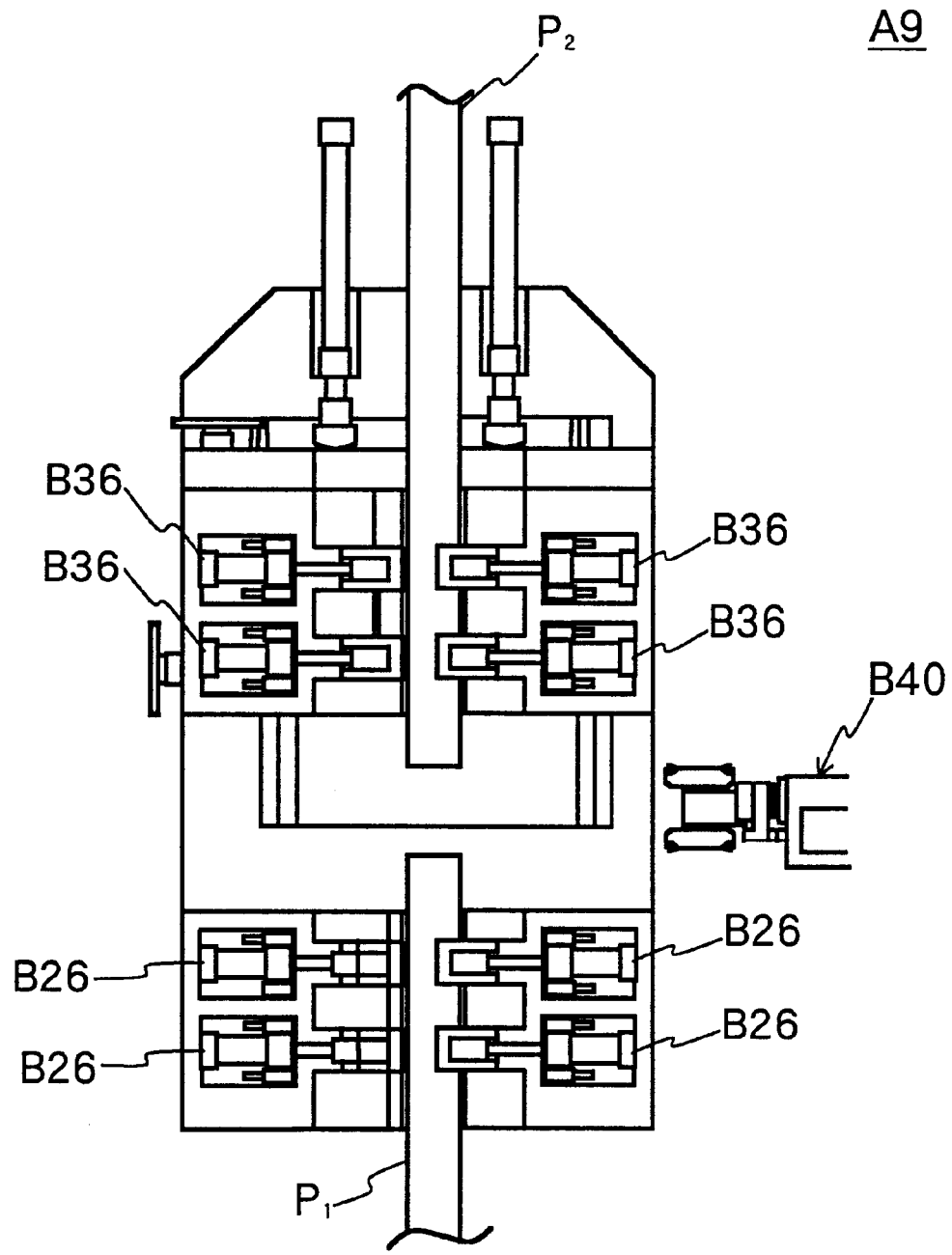
FIG. 24 is a plane of Embodiment 10 under the present invention.
Figure 25:
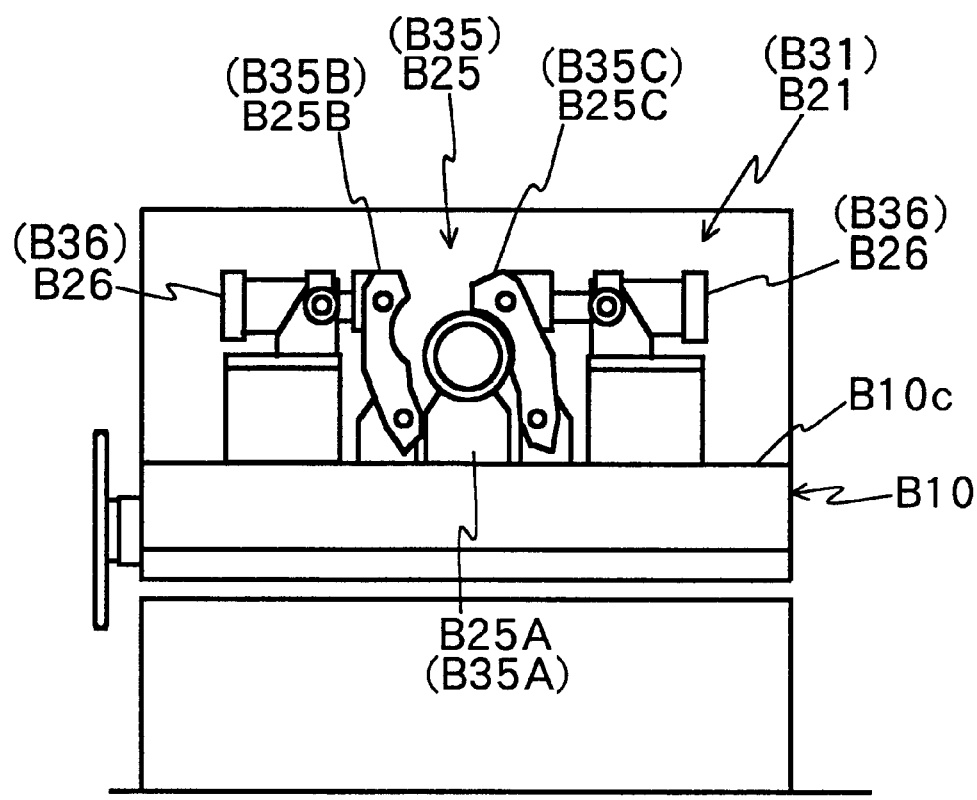
FIG. 25 is a side-view of the Embodiment 10.

FIG. 24 and FIG. 25 show a diffusion bonding apparatus A9 pertinent to Embodiment 10 under the present invention. This Embodiment 10 is a modification of Embodiment 3 having a construction wherein the second and the third block pawls (mobile block pawl) B25B, B25C (B35B, B35C) mounted on the main clamping body B22 (B32) revolt freely by being driven with the pawl driving hydraulic cylinders B26 and B26 (B36 and B36) which are installed to face these second and third block pawls B25B, B25C (B35B, B35C).

Except for the above, the construction and the operation of Embodiment 10 is the same as those of Embodiment 3.

Embodiment 11

Figure 26:
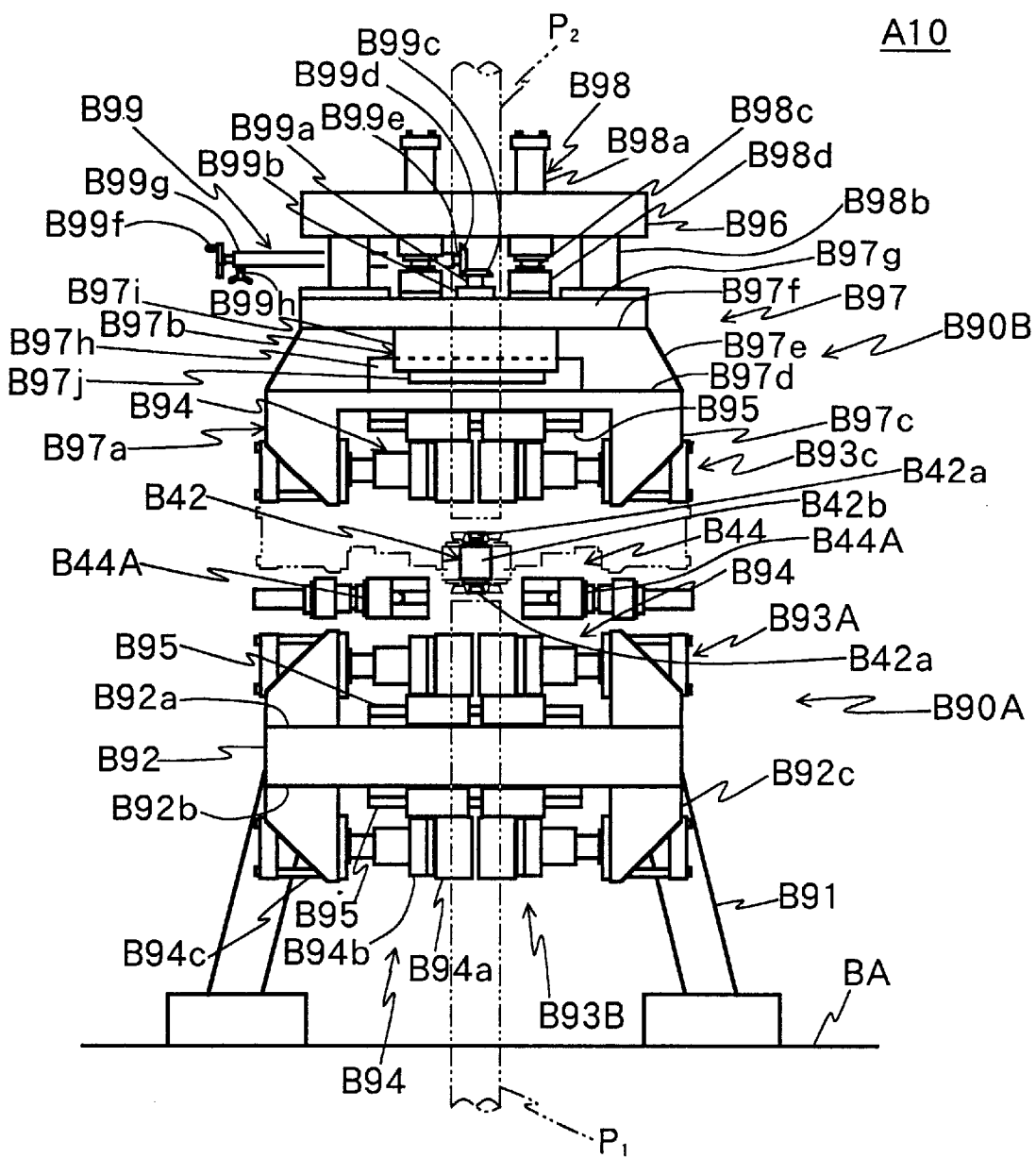
FIG. 26 is a front-view of Embodiment 11.

FIG. 26 shows a diffusion bonding apparatus A10 pertinent to Embodiment 11 under the present invention. This diffusion bonding apparatus A10 of Embodiment 11 mainly consists of a lower mechanism B90A installed on a base BA which supports the material P1 on the lower side in a vertical direction; an upper mechanism B90B which is located above the lower mechanism B90A while being sustained by a means of sustaining the material P2 on the upper side which presses it on to the material P1 on the down side with a predetermined pressure; a finishing device B42 to finish the ends of the materials P1 and P2; and a heating device B44 to bond the materials P1 and P2 by diffusion bonding.

The lower mechanism B90A comprises a plate B92 which is horizontally supported by legs B91 on the base BA, and has a hole (not clearly indicated in the drawing) in which the material P1 on the lower side goes through; and an upper side clamping means B93A and a lower side clamping means B93B which are both installed on the upper end B92a and the lower end B92b of the plate B92 respectively. Both the upper side clamping means B93A and the upper side clamping means B93B have a pair of mobile clamps B94 positioned to face to each other.

The mobile clamp B94 comprises a clamping section B94b which has a mobile block pawl B94a to run on a pair of rails B95 and B95 located on the upper end of the plate B92a and the lower end of the plate B92b respectively; and a main body driving hydraulic cylinder B94c which moves the clamping section B94b on the rails B95 and B95. The main body driving hydraulic cylinder B94c is fixed on a block B92c located on the plate B92.

The upper mechanism B90B comprises a plate B96 supported in an appropriate manner and located above the lower mechanism B90A; a pressurizing unit B97 installed beneath the plate B96; a lifting means B98 to lift up and down the pressurizing unit B97; pressure adjusting means B99 to adjust the pressure applied on the bonding part; and a clamping means B93C installed in the pressurizing unit B97. The clamping means B93C is concretely a mobile clamp B94, and its main body driving hydraulic cylinder B94c is fixed on fixture of the pressurizing unit B97.

The pressurizing unit B97 comprises a pressurizing section B97a and a pressure adjusting section B97b which adjusts the pressure of the pressurizing section B97a. The pressurizing section B97a comprises a lower block B97c in a shape of gantry; a middle block B97e shaped in a trapezoid and connected directly with the upper end B97d of the lower block B97c; and an upper block B97g directly connected with the upper end B97f of the middle block B97e. In a cavity B97h made in the bottom of the middle block B97e, an adjusting block B97i, which is a component of the pressure adjusting section B97b, is located with a pressure adjusting part B97j facing the upper end B97d of an adjusting block of the lower block B97c.

The lifting means B98 concretely comprises a pair of hydraulic cylinders B98a and B98a facing each other around the central axis of the upper mechanism B90B, and a pair of guiding axes B98b and B98b which guide the movement of the pressurizing unit B97 driven by the hydraulic cylinder B98a and are positioned outside the hydraulic cylinders B98a and B98a respectively. A bonding component B94d located on the end of a piston-rod B98c of the hydraulic cylinder B98a joins with the upper end of the upper block B97g of the pressurizing unit B97. The end of the guiding axis B98b can freely slide in a cylindric cavity (illustration omitted) which is located around the upper block B97g and the middle blocks B97e.

The pressure adjusting means B99 adjust the pressure of adjusting section B97b to be applied to the upper end B97d of the lower block B97c, thereby adjusts the pressure to be applied to the bonding part. The pressure adjusting means B99 comprises a lifting screw component B99a connected with the adjusting block B97*i*, thereby lifts the adjusting block B97*i* up and down; a female screw block B99*b* which the lifting screw component B99*a* is screwed into, and which is positioned on the upper end of the upper block B97*g*; a bevel gear B99*c* positioned on the upper end of the screw component for lifting B99*a*; another bevel gear B99*d* which gears the bevel gear B99*c*; a rotating axis B99*e* with its end connected to the bevel gear B99*d*; a rotation handle B99*f* which is connected to the rear end of the rotating axis B99*e*; a support pipe B99*g* which supports the rotating axis B99*e*; and a lock screw B99*h* attached to the support pipe B99*g* which locks the rotating axis B99*e* in movement. The finishing device B42 grinds the ends of the materials P2 of upstream side and the material P1 of downstream side. It comprises a pair of grinding components B42*a* and B42*a* which is located with facing the bonding surface of the materials P1 and P2 respectively; a motor B42*b* which rotates the grinding components B42*a* and B42*a*; a transporting mechanism (illustration omitted) which transports the motor B42*b* along the bonding surface.

The heating device B44 heats the bonding part while sealing it with sealing gas. It comprises split heating coils B44A and B44A which have gas jackets. The split heating coils B44A and B44A move freely in the direction of the bonding part, and at the bonding part these two come together to heat the bonding part.

The following describes the operation of the diffusion bonding apparatus A10 of Embodiment 11 of the above construction supposing that the material P1 is being vertically clamped in the lower mechanism B90A.

1. Move backward the mobile block pawls B94*a* and B94*a* of the mobile clamps B94 and B94 of the clamping means B93C, and open the clamping means B93C.
2. With the feeding device, not indicated in the drawing, lift down the material P2 until its end extrudes from the bottom of the clamping means B93C by a specified length.
3. Move forward the mobile block pawls B94*a* and B94*a* of the mobile clamps B94 and B94 of the clamping means B93C, and close the clamping means B93C. After this, the material P2 is vertically clamped with the clamping means B93C.
4. With the finishing device B42, finish the ends of the materials P1 and P2 as finely as required.
5. With the lifting means B98, lift down the pressurizing unit B97, and make the end of the material P2 being clamped with the clamping means B93C contact with the back-end of the material P1 being vertically clamped with the clamping means B93A and B93B of the lower mechanism B90A.
6. Increase the pressure of the hydraulic cylinder B98*a* for the lifting means B98 to a predetermined pressure, and apply the pressure to the bonding part of the materials P1 and P2. While applying the pressure, the pressure can be adjusted, if necessary, by moving the rotating handle B99*f* of the pressure adjusting means B99, and by descending or ascending the pressure adjusting section B97*b* of the pressurizing unit B97.
7. With the heating device B44, heat the bonding part of the materials P1 and P2 a predetermined temperature, and bond the materials P1 and P2.
8. Open the clamping means B93A and B93B of the lower mechanism B90A and the clamping means B93C of the upper mechanism 90B respectively.
9. With the discharging device, not indicated in the drawing, discharge the material P2 until its back end remains out of the clamping means B93A by a specified length.
10. Close the clamping means B93A and B93B of the lower mechanism B90A. After this, the material P2 is vertically clamped with the clamping means B93A and B93B.

The above procedure 1 through 10 is repeated until a pipe of the specified length is manufactured.

As described above, under Embodiment 11, the desired length of a pipe can be manufactured by diffusion bonding.
Embodiment 12

Figure 27:
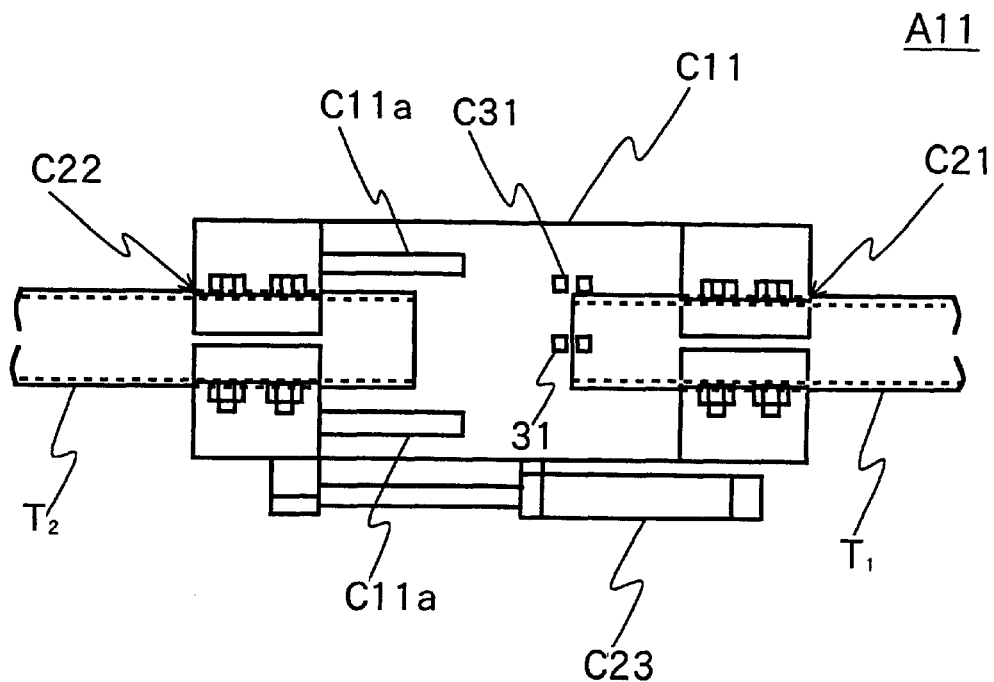
FIG. 27 is a plane of diffusion bonding apparatus to be used with the position adjusting means to adjust position of materials of Embodiment 12 under the present invention.
Figure 28:
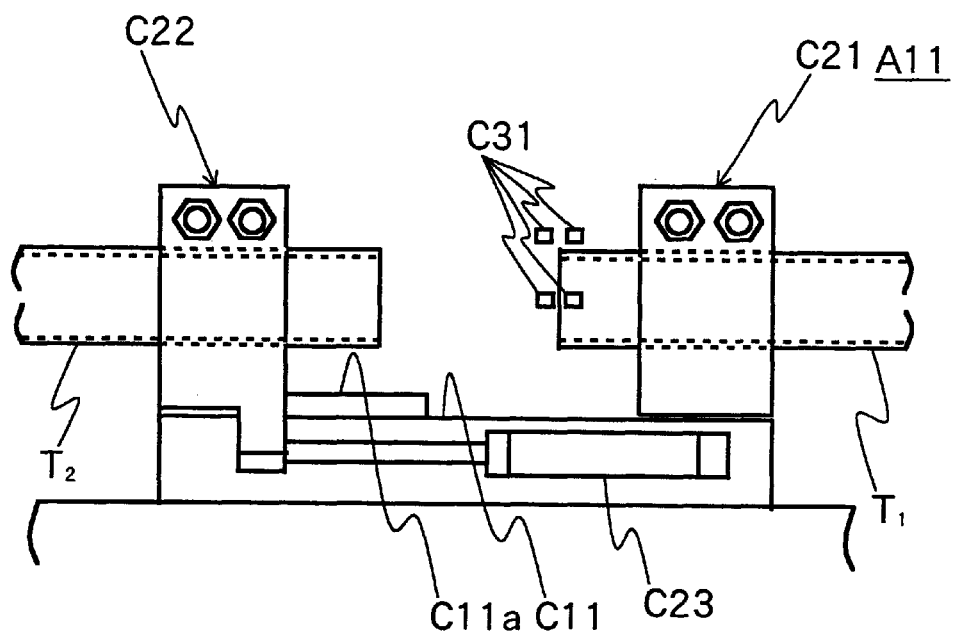
FIG. 28 is a side view of the Embodiment 12.
Figure 29:
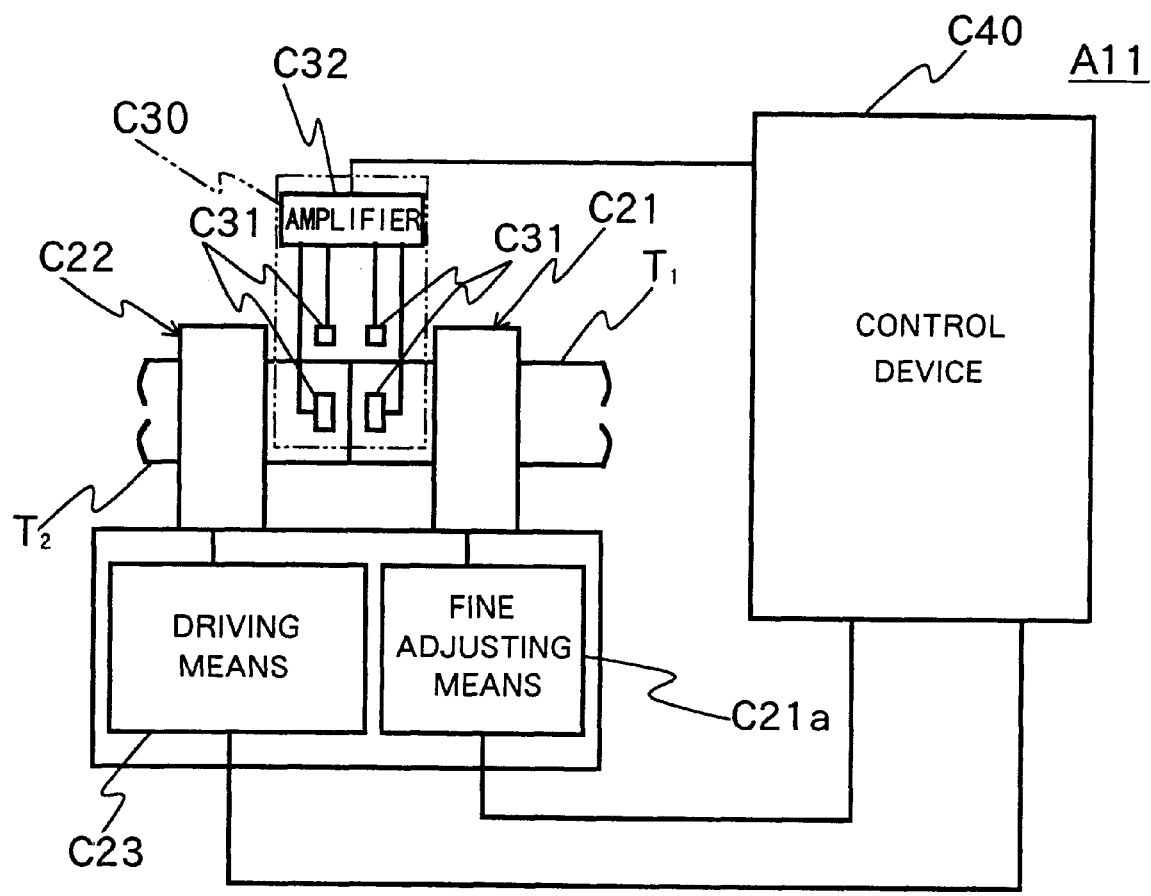
FIG. 29 is a block diagram of the Embodiment 12;.

FIG. 27 to FIG. 29 illustrate a position adjusting means to adjust position of materials under a diffusion bonding apparatus A11 of Embodiment 12 of the present invention. This position adjusting means mainly consists of a bed C11, a first clamp C21 placed on the bed C11, a second clamp C22 placed on the bed C11 facing the first clamp C21, a driving means C23 to drive the second clamp C22, a detection means C30 to detect a difference in position at the bonding point C30, and a control device C40.

The first clamp C21 has a built-in fine adjustment means C21*a* that moves up and down or right and left and corrects a difference in position between two materials to be bonded at their bonding point.

The second clamp C22 moves forward and backward for the first clamp C21 running on a pair of guide-rails C11*a* and C11*a* which are laid along the horizontal axis of the bed 11.

The driving means C23 to drive the second clamp C22 is a hydraulic cylinder, for example, and it can be installed on both sides of the second clamp C22 although it is installed on one side in FIG. 27.

The detection means C30 to detect a difference in position comprises a pair of position detection sensors C31 and C31 with each placed in the horizontal direction and in the vertical direction on the side of the first clamp C21 to detect a horizontal and vertical position of the bonding point of the material clamped with the first clamp C21; a pair of position detection sensors C31 and C31 with each placed in the horizontal direction and in the vertical direction on the side of the second clamp C22 to detect a horizontal and vertical position of the bonding point of the material clamped with the second clamp C22, and an amplifier C32 to amplify signals sent from these sensors C31, C31, 31 and C31 respectively (refer to FIG. 29), and detected values by each of the sensors C31, C31, C31, and C31 are amplified by the amplifier C32 and input to the control device C40 which determines a difference in position between the two materials to be bonded in numerical values. For this sensor C31, it is preferable to use a non-contact type position sensor for example.

The control device C40 is equipped with, for example, a ROM and a RAM with a CPU as a center.

The following describes procedures to correct a difference in position between the materials T1 and T2 with the position adjusting means of the above-mentioned construction.

1. Insert the materials T1 and T2, which may be tubes for instance, in the first clamp C21 and the second clamp C22 respectively until each end of the tubes reaches over the bed C11, and then clamp them.
2. Start the driving means C23 to move the second clamp C22 towards the first clamp C21 until the sides of the materials T1 and T2 contact each other.
3. Then the materials T1 and T2 mutually contact, the position detection sensors C31, C31, C31, and C31 the detection means C30 to detect a difference in position, which is located in the vicinity of the bonding point, detect the position of the end of each material T1 and T2 in numerical values, which are then amplified by the amplifier C32 and input to the control device C40.
4. The control device C40 computes a difference in position at the bonding point according to the numerical values detected by the position detection sensors C31, C31, C31, and C31; it then determines a work value that the first clamp C21 needs to correct such a difference, and it inputs the determined work value to the fine adjustment means C21a.

5. The fine adjustment means C21a operates according to the given work value so that the difference in position between the two materials, T1 and T2, is corrected and the alignment is completed.

Thus, in Embodiment 12, a difference in position between the materials T1 and T2 is corrected in the above-mentioned way.

Embodiment 13

Figure 30:
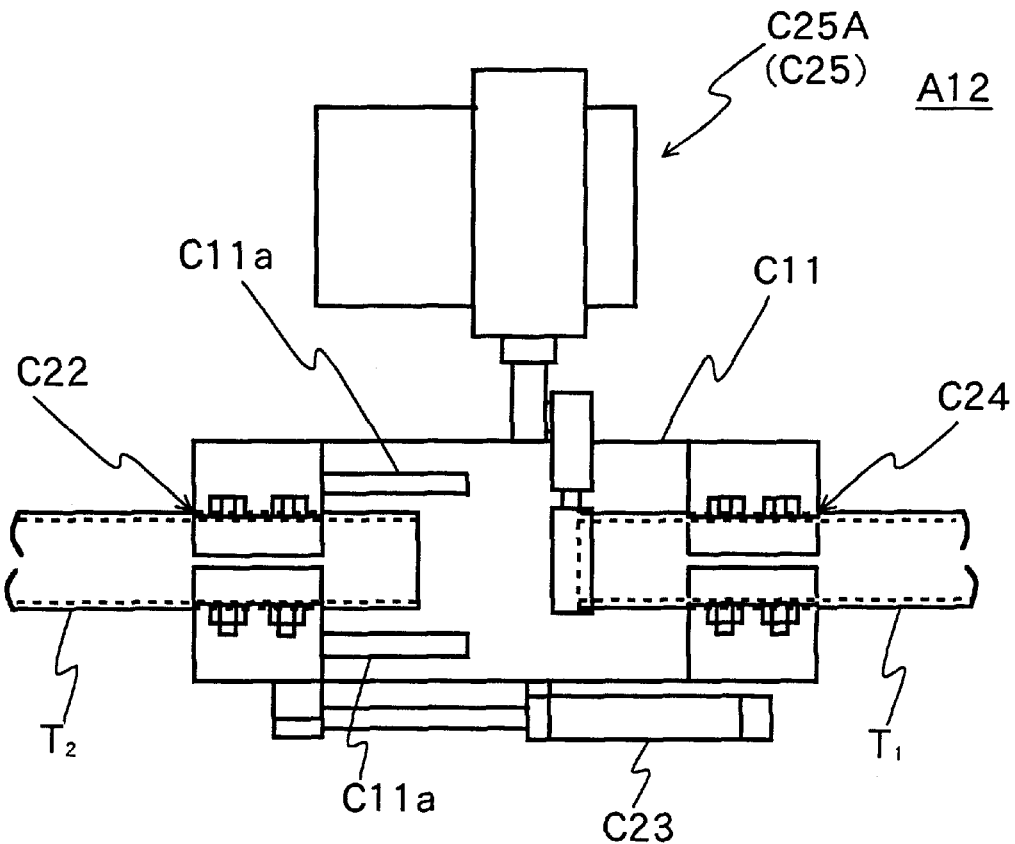
FIG. 30 is a plane of diffusion bonding apparatus to be used with the position adjusting means to adjust position of materials of Embodiment 13 under the present invention;.
Figure 31:
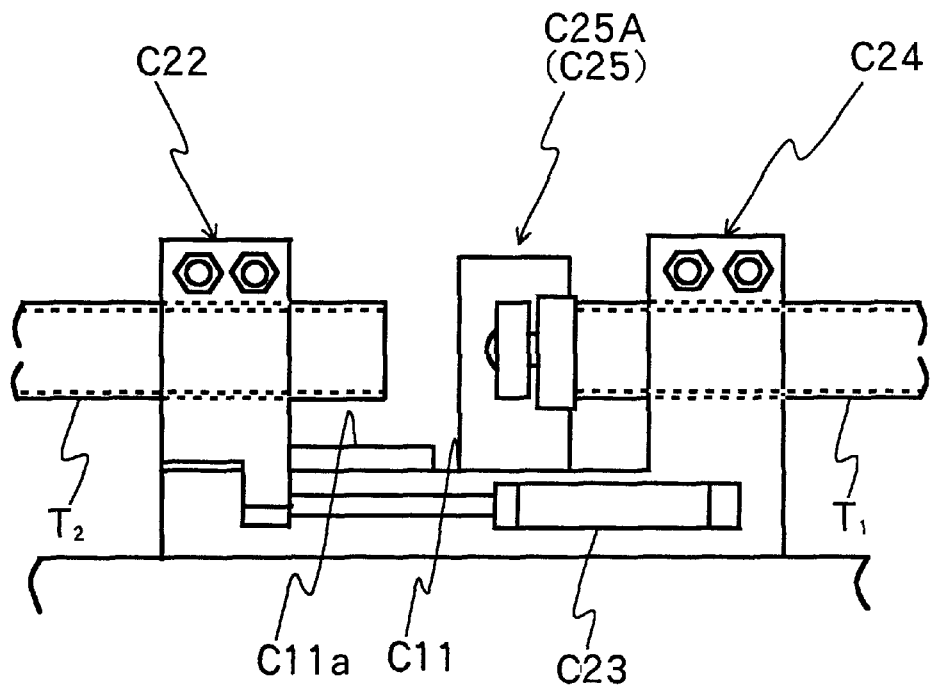
FIG. 31 is a side-view of the Embodiment 13.
Figure 32:
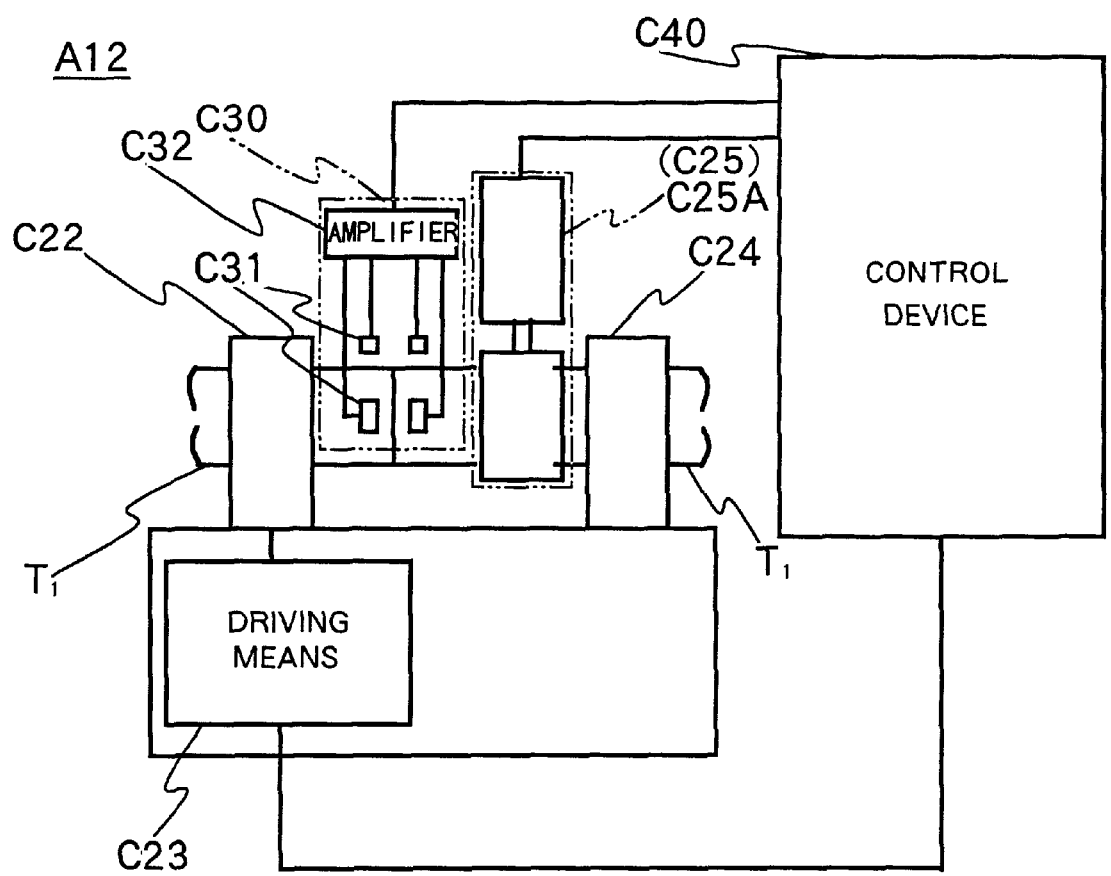
FIG. 32 is a block diagram of the Embodiment 13.

FIG. 30 to FIG. 32 illustrate another position adjusting means to adjust position of materials under a diffusion bonding apparatus A12 of Embodiment 13 of the present invention, and this position adjusting means mainly consists of a bed C11; a first clamp C24 firmly placed on the bed C11; a second clamp C22 placed on the bed C11 facing the first clamp C24; a driving means C23 to drive the second clamp C22; correcting means C25 to correct a difference in position; a detecting means C30 to detect a difference in position at the bonding point; and a control device C40.

The correcting means C25 correct a difference in position is concretely a multiple-joint robot C25A having hands to hold the end-parts of the materials T1 and T2. The location of the robot C25A is adjusted so that it can hold somewhere in the vicinity of the bonding point of the two materials while avoiding interfering with the position detection sensors C31, C31, C31, and C31. For the sake of convenience of drawing, the position detection sensors C31, C31, C31, and C31 are omitted in FIG. 30 to FIG. 32.

The second clamp C22 and others of the position adjusting means in Embodiment 13 is constructed in the same way as those of Embodiment 12.

The following describes procedures to correct a difference in position between the materials T1 and T2 with the position adjusting means having said construction.

1. Insert the materials T1 and T2, which may be tubes for example, in the first clamp C21 and the second clamp C22 respectively until each end of the tubes reaches over the bed C11, and clamp them.
2. Start the driving means c23 to move the second clamp C22 towards the first clamp C24 until the ends of materials T1 and T2 contact each other.
3. When the materials T1 and T2 contact each other, the position of each end of the materials T1 and T2 in contact is detected with the position detection sensors C31, C31, C31, and C31 of the detecting means C30 to detect a difference in position, which is located in the vicinity of the bonding point of the two materials, and numerical values detected are input to the control device C40.
4. The control device C40 computes a difference in position in numerical values, determines a work value that the robot C25A needs to correct the difference, and inputs the determined work value to the robot C25A.
5. The robot C25A operates according to the given work value, and corrects the difference in position between the materials T1 and T2 for alignment.

Thus, in Embodiment 13, a difference in position between the materials T1 and T2 is corrected in the above-mentioned way.

Embodiment 14

Figure 33:
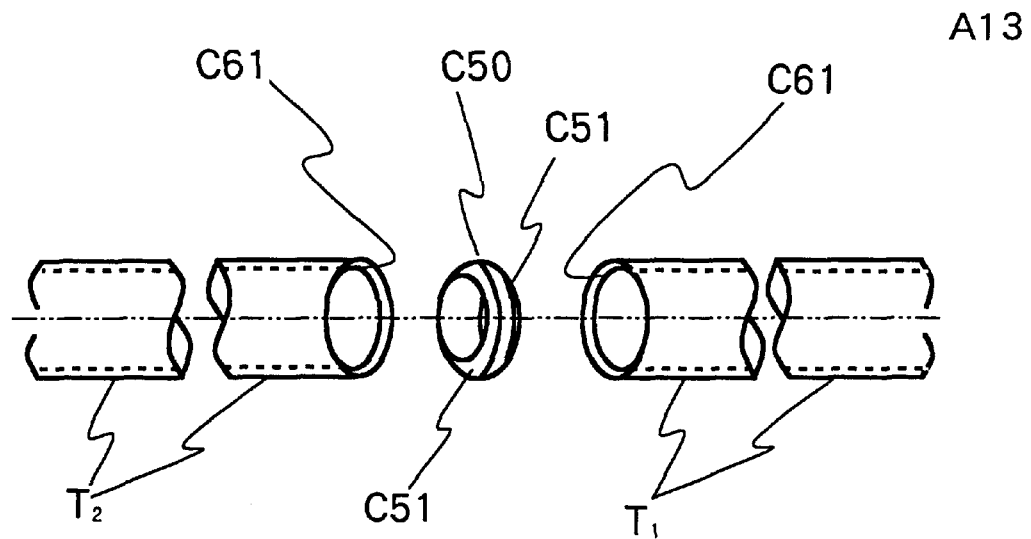
FIG. 33 is an exlanatory illustration illustrating the position adjusting means to adjust position of materials of Embodiment 14 under the present invention.

FIG. 33 illustrates another position adjusting means to adjust position of materials under a diffusion bonding apparatus A13 of Embodiment 14 of the present invention. This position adjusting means is to correct a difference in position between the materials T1 and T2 with an insertion of an aligning component 50 between the two. The position adjusting means used in Embodiment 14 is the same as that in Embodiment 13 except for a correcting means 25 which Embodiment 14 does not requires.

To be more specific, the procedures of correcting a difference in position under this Embodiment 14 are: to form concave fitters in a spherical shape C61 and C61 on each of the bonding ends of material T1 and T2; to form convex fitters in a spherical shape C51 and C51 which fit the concave fitters in a spherical shape C61 and C61 respectively on both ends of an insert (aligning component) C50 which has the same outer diameter and inner diameter of those of materials T1 and T2; to fix the insert C50 over the bed C11 in an appropriate manner while fitting one of convex fitters C51 in the concave fitter C61 on the material T1 clamped with the first clamp C24; to drive the driving means C23 to move the second clamp C22 towards the first clamp C24; to fit the concave fitter C61 on the material T2 clamped with the second clamp C22 in the convex fitter C51 on the other side of the insert C50; and to move the second clamp C22 towards the first clamp C24 in this condition; thus, an alignment is achieved through an autonomous correction of a difference in position by leading the bonding ends of the materials T1 and T2 to the convex fitters C51 and C51 on each end of the insert C50. In this case, since the convex fitters C51 and C51 and concave fitters C61 and C61 are all in a spherical shape, the convex fitters C51 and C51 on the bonding ends of the materials T1 and T2 smoothly slide in.

Embodiment 15

Figure 34:
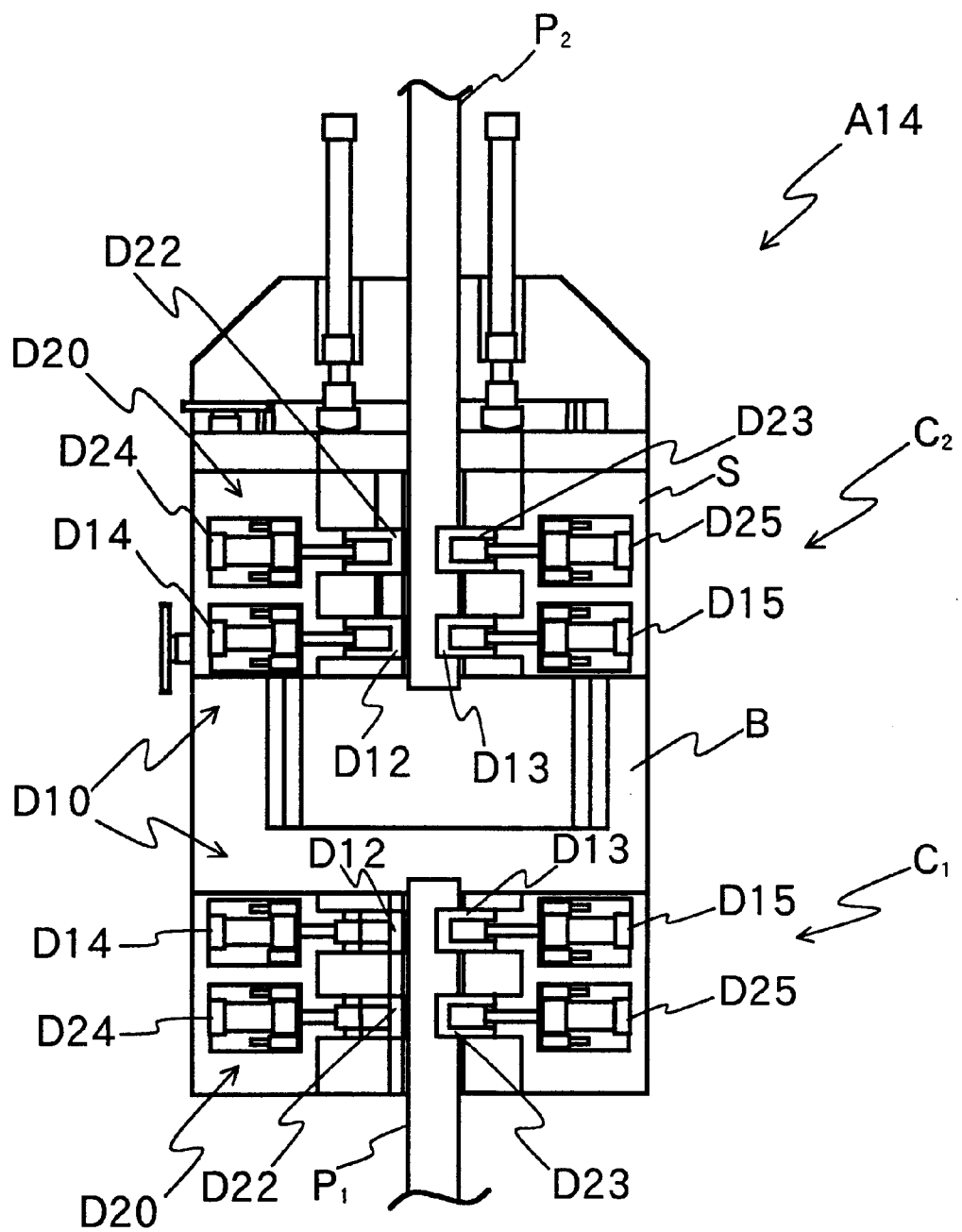
FIG. 34 is a plane of the diffusion bonding apparatus employing the clamping mechanism of Embodiment 15 under the present invention.
Figure 35:
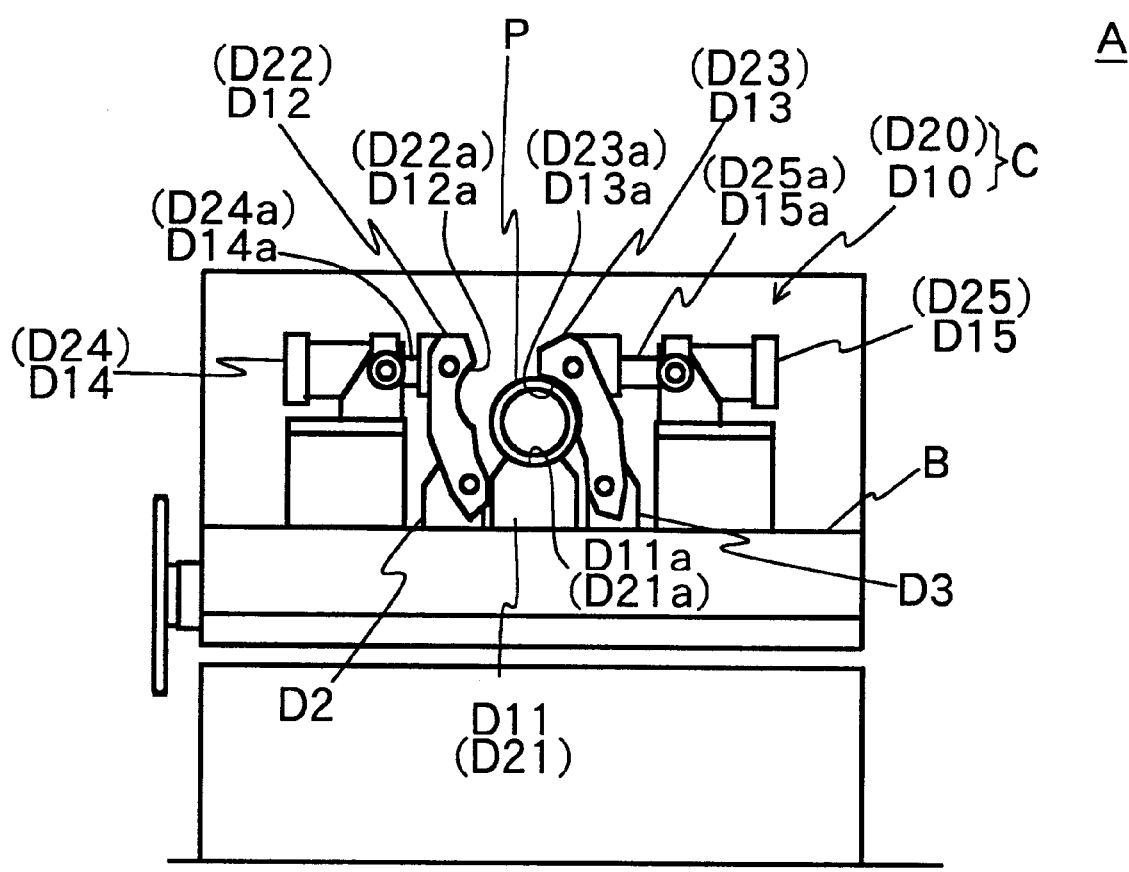
FIG. 35 is a side view of the Embodiment 15.

FIGS. 34 and 35 show a diffusion bonding apparatus A14 with a clamping mechanism pertinent to Embodiment 15 under the present invention. This clamping mechanism C is installed on both the material discharging side and feeding side. Each of the clamping mechanisms C1 and C2 comprising a first clamping part D10 which clamps the vicinity of the end of the material P; and a second clamping part D20 which is located further from the end of the material P and clamps the material P in that position. While the first clamping part D10 carries the clamping force necessary to correct a deformation created in the end of the material P, the second clamping part D20 carries the clamping force necessary to apply a predetermined pressure to the bonding part of the material P. In other words, this clamping mechanism C have a clamping means, i.e. the first clamping part D10 and the second clamping part D20, which do not create a deformation in the end of the material P, which otherwise causes a drop in the strength in a joint. In Embodiment 15, the material P is concretely a pipe.

The first clamping part D10 of the clamping mechanism on the material discharging side (the discharge clamping mechanism) C1 which clamps the pipe P1 on the discharging side concretely comprises a first block pawl having a holding part D11a in the shape of a circle; a second block pawl D12 having a holding part D12a in the shape of a circle; and a third block pawl D13 having a holding part D13a in the shape of a circle. The first block pawl D11 is fixed on a bed B of the main body of the diffusion bonding apparatus A14 with its holding part D11a pointing upward; and the second block pawl D12 and the third block pawl D13 are fixed on the bed B at their bottoms with fixtures D2 and D3 respectively while being allowed to freely rotate, with their holding parts D12a and D13a facing each other, and with their tops connected to a piston-rod D14a and a piston-rod D15a of a pawl driving hydraulic cylinder D14 and a pawl driving hydraulic cylinder D15 respectively. Here, the driving power of both pawl driving hydraulic cylinders D14 and D15 is adjusted to give the second block pawl D12 and the third block pawl D13 the clamping force needed to correct a deformation created in the ends of the pipes P1 and P2 respectively.

Like the first clamping part D10, the second clamping part D20 comprises a first block pawl D21 having a holding part D21a; a second block pawl D22 having a holding part D22a; and a third block pawl D23 having a holding part D23a. The first block pawl D21 is fixed on a bed B of the main body of the diffusion bonding apparatus A14 with its holding part D21a pointing upward; and the second block pawl D22 and the third block pawl D23 are fixed on the bed B at their bottoms with fixtures D2 and D3 respectively while being allowed to freely rotate, with their holding parts D22a and D23a facing each other, and with their tops connected to a piston-rod D24a and a piston-rod D25a of a pawl driving hydraulic cylinder D24 and D25 for located outside thereof respectively. Here, the driving power of both pawl driving hydraulic cylinders D24 and D25 for the block pawls is adjusted to give the second block pawl D22 and the third block pawl D23 the needed clamping force to apply a predetermined pressure to the bonding part of the pipes P1 and P2. To make the drawing simple, all the components of the second clamping part D20 are indicated with marks in brackets in FIG. 35.

Also, the clamping mechanism (the feeding side clamping mechanism) C2 on the feeding side to hold the pipe P2 on the feeding side has the same construction as the above clamping mechanism C1 on the discharging side, except that the first block pawls D11 and D21, the second block pawls D12 and D22, and the third block pawls D13 and D23 are all fixed on a mobile table S which is installed on the bed B of the main body.

Figure 36:
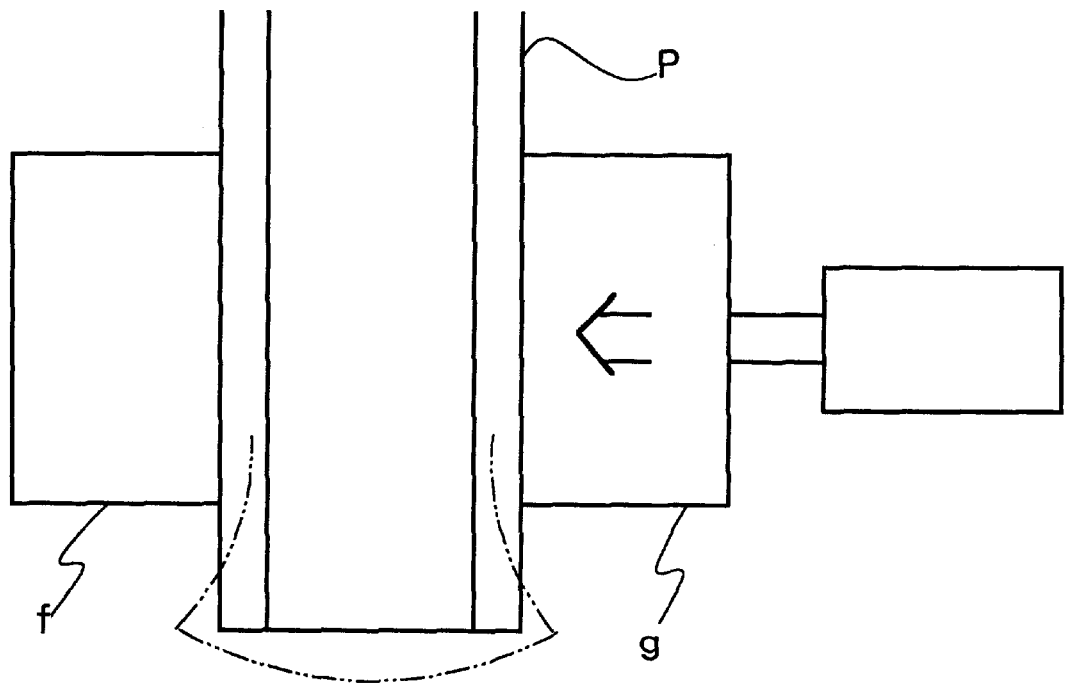
FIG. 36 is an explanatory illustration illustrating a deformation created in the end of the pipe when clamped with a clamping mechanism.

As described above, in Embodiment 15, the clamping mechanism C comprises the first clamping part D10 and the second clamping part D20; and the first clamping part D10 carries the needed clamping force to correct any deformation created in the end of the pipe, while the second clamping part D20 carries the needed clamping force to apply the predetermined pressure to the bonding part of the pipe P. Consequently, clamping the end of the pipe P with the clamping mechanism C of the above construction does not create a deformation in the end of the pipe P as shown in FIG. 36. Therefore, the strength in the joint will not drop any longer due to deformation created in the end of the pipe P. In FIG. 36, mark f and g indicate block pawls for clamping.

Embodiment 16

Figure 37:
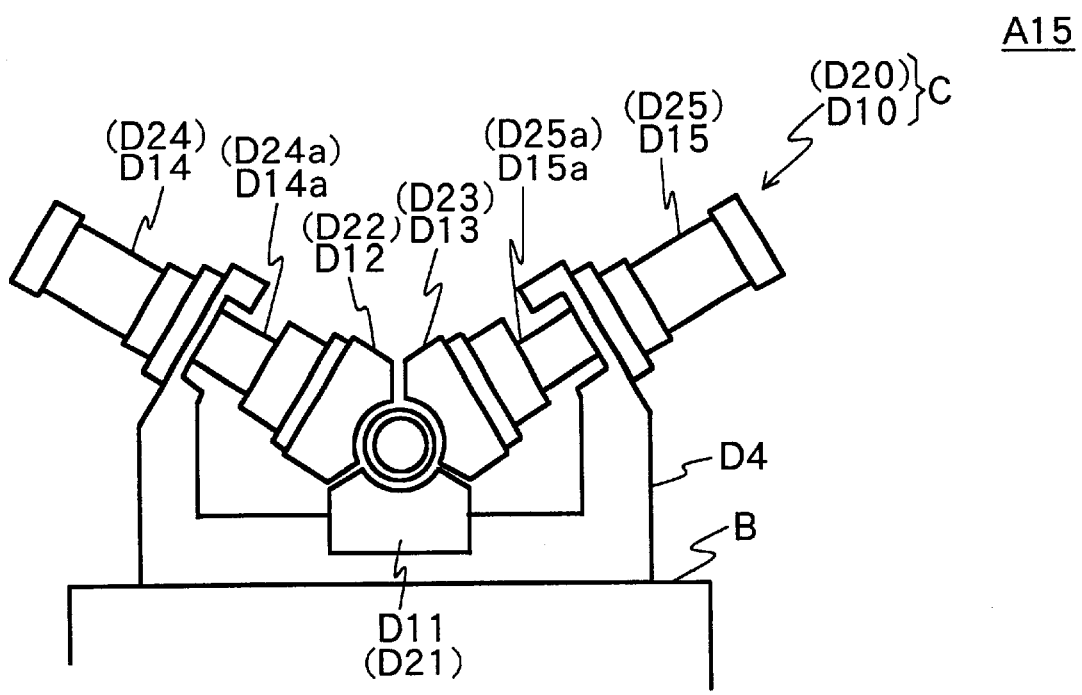
FIG. 37 is a side view of the clamping part of the clamping mechanism of Embodiment 16 under the present invention;.

FIG. 37 shows a side view of a clamping part of a clamping mechanism C pertinent to a diffusion bonding apparatus A15 of Embodiment 16 under the present invention. This Embodiment 16 is a modification of Embodiment 15, wherein the second block pawls D12 and D22 and the third block pawls D13 and D23 of the first clamping part D10 and the second clamping part D20 respectively move freely with their backs connected to the ends of the piston-rods D14a, D24a, D15a, and D25a of the pawl driving hydraulic cylinders D14, D24, D15, and D25 respectively which are all mounted on the bed B with the fixtures D4 downward and diagonally at a specified angle. The construction (except for the above), the function, and the effect of Embodiment 16 are all the same as those of Embodiment 15. To make the drawing simple, all the components of the second clamping part D20 are indicated with marks in brackets in FIG. 37.

Embodiment 17

Figure 38:
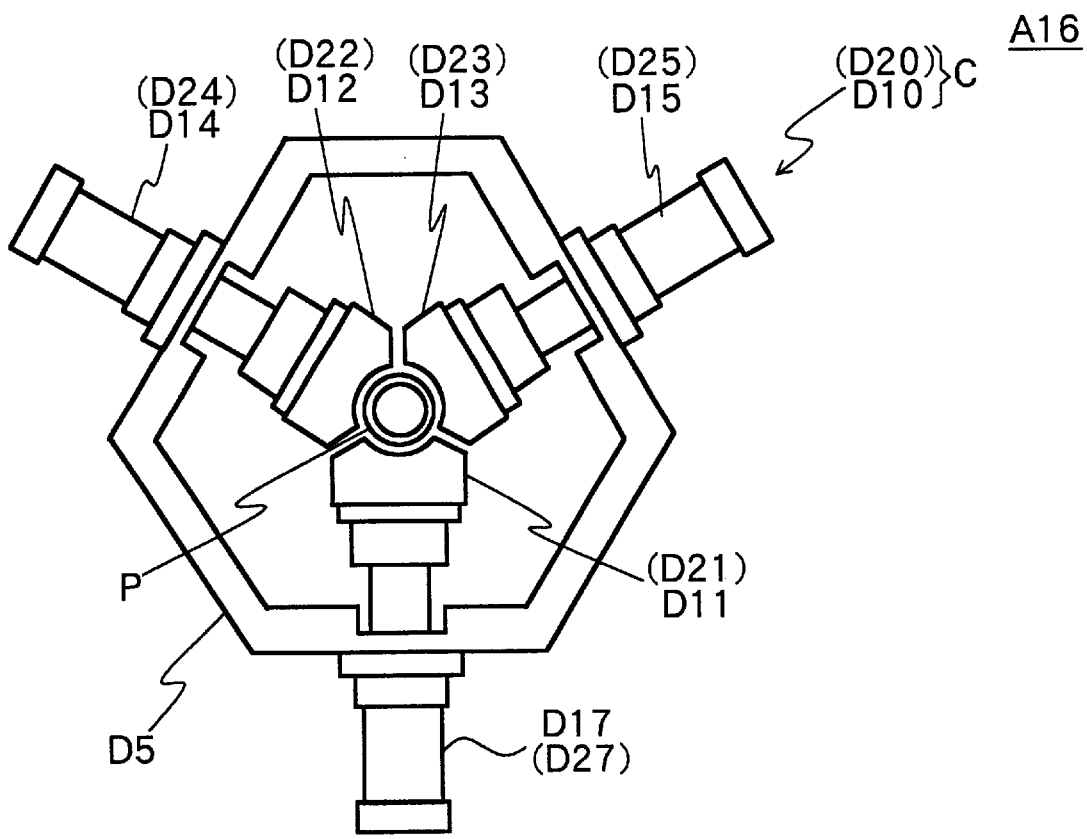
FIG. 38 is a plane of the clamping part of the clamping mechanism of Embodiment 17 under the present invention.

FIG. 38 shows a clamping mechanism C pertinent to a diffusion bonding apparatus A16 of Embodiment 17 under the present invention. This Embodiment 17 is employed in a diffusion bonding apparatus in which the pipe P is fed vertically, whereas Embodiment 15 and Embodiment 16 are employed in a diffusion bonding apparatus in which the pipe P is fed horizontally. Therefore, in Embodiment 17, the first block pawls D11 and D21 of the first clamping part D10 and the second clamping part D2 move freely while being driven by the pawl driving hydraulic cylinders D17 and D27; and the pawl driving hydraulic cylinders D17, D27, D14, D24, D15 and D25 which drive the block pawls D11, D21, D12, D22, D13, and D23 respectively are all supported by supporters D5 installed in the diffusion bonding apparatus. The construction except for the above, the function, and the effect of Embodiment 17 are all the same as those of Embodiment 15. To make the drawing simple, all the component of the second clamping part D20 are indicated with marks in brackets in FIG. 38.

In Embodiment 15 to Embodiment 17, it is preferred to locate the first clamping part D10 and the second clamping part D20 a distance five times longer than the diameter of the material P in order to avoid a creation of a deformation in the bonding part by the second clamping part D20.

Embodiment 18

Figure 40:
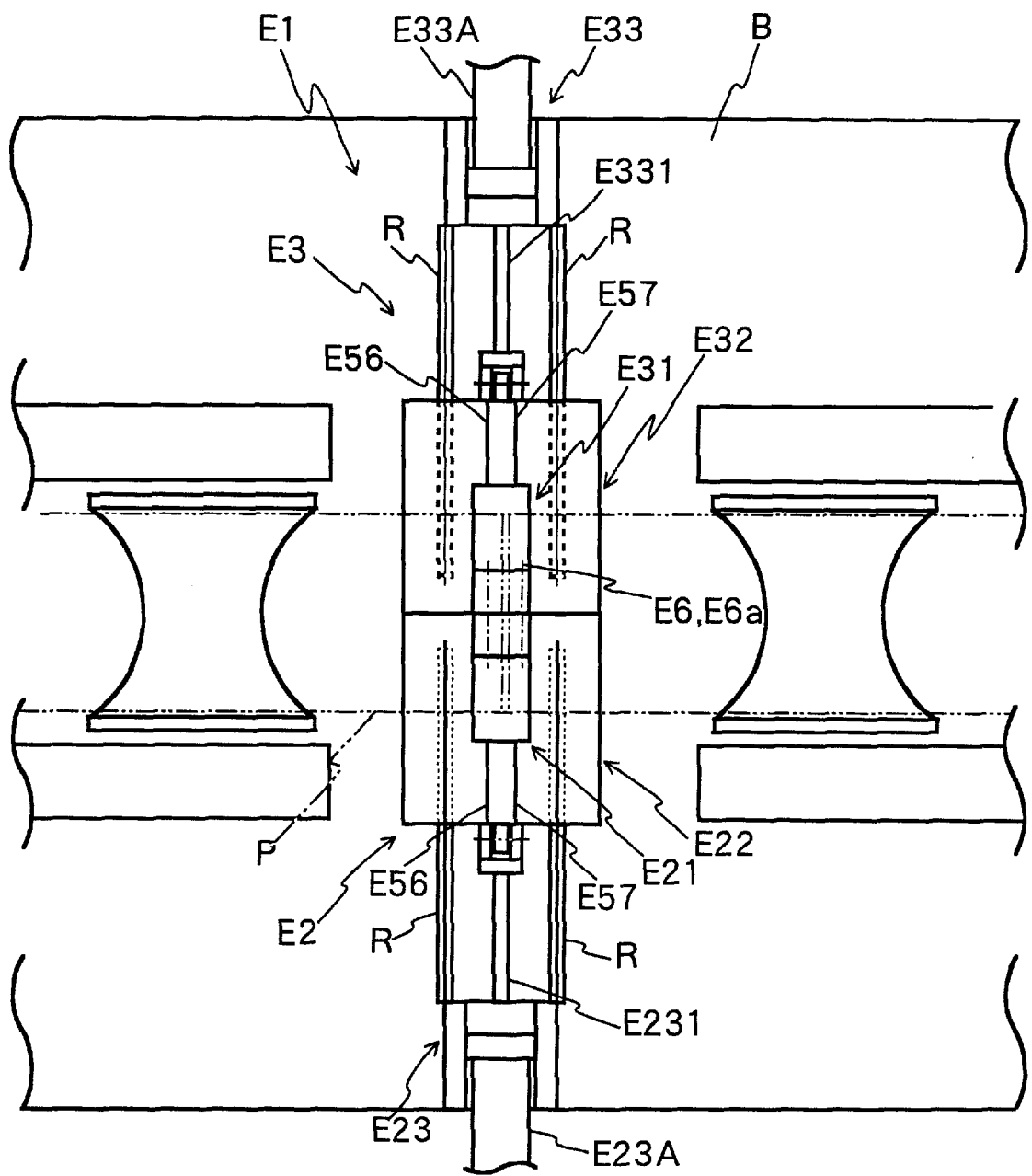
FIG. 40 is a plane of the Embodiment 18.

FIG. 39 and FIG. 40 show a heating coil under a diffusion bonding apparatus A17 of Embodiment 18 under the present invention. This heating coil E1 comprises a right block E2 and a left block E3 so that it can be split into two blocks, and is mounted on the bed B.

To be more specific, the right block E2 comprises a right heating coil E21, a right gas jacket E22 which covers the right heating coil E21, and a driving means E23 which moves the right heating coil E21 and the right gas jacket E22 in the horizontal direction (moving forward and moving backward for the material P); while the left block E3 comprises a left heating coil E31, a left gas jacket E32 which covers the left heating coil E31, and a driving means E33 which moves the left heating coil E31 and the left gas jacket E32 in the horizontal direction (moving forward and moving backward for the material P).

Figure 41A:
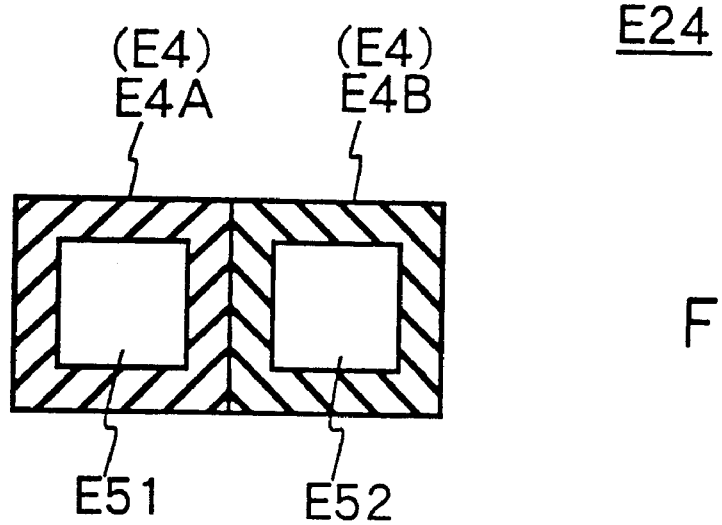
FIG. 41 is a sectional-views of the coils used in the Embodiment 18 of the present invention, wherein Mark (a) is an illustration showing the coil made of two square pipes positioned side-by-side connection, while Mark (b) is an illustration showing the coil having two channels for cooling water on both sides.
Figure 41B:
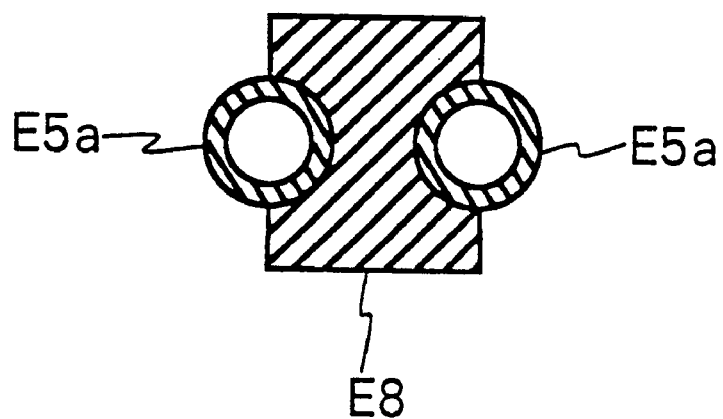
Figure 42:
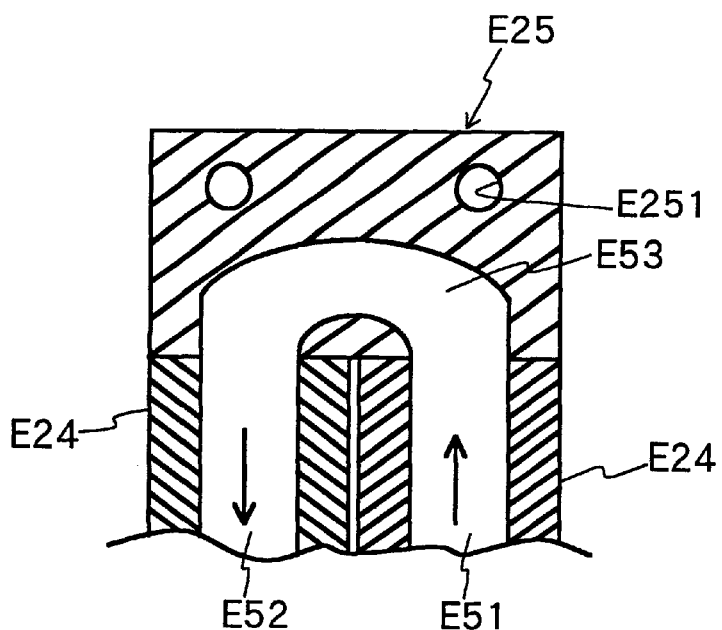
FIG. 42 is a vertically sectional-view of the upper connecting component.
Figure 43:
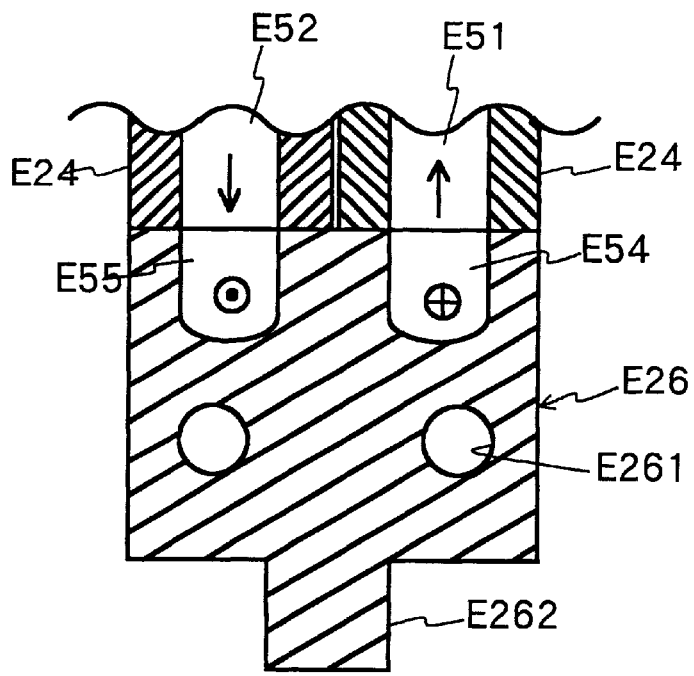
FIG. 43 is a vertically sectional-view of the lower connecting component.

The right heating coil E21 comprises a semicircle coil E24 and two connecting components incorporated in each side of the coil E24, i.e. the upper connecting component E25 and the lower connecting component E26. As shown in FIG. 41(a), this coil E24 is constructed, for example, by two square bronze pipes E4 positioned side by side connection, and the cooling water runs inside the pipes for the prevention of burn-out of the coil E24. To be specific, one square pipe E4A constitutes the one way E51 of the cooling water channel E5, whereas the other square pipe E4B constitutes the other way E52 of the cooling water channel E5. As shown in FIG. 42, the upper connecting component E25 in a block having a turning channel E53 at its bottom where the cooling water channel E5 makes a turn from the one way E51 to the other way E52, and a hole E251 for a bolt E6 for clamping in its upper part. The upper connecting component E25 is incorporated into the upper side of the coil E24. As shown in FIG. 43, the lower connecting component E26 is a block having a cooling water supply channel E54 connected to the one way E51 and a cooling water discharge channel E55 connected to the other way E52 in its upper side, a hole E261 for a bolt E6 for clamping in its center, and the connecting part E262 to the power source in its bottom. This lower connecting component is incorporated into the bottom of the coil E24. A power source cable E7 is connected to the connecting component E26 with flexibility. The coil E24 is not only limited in such a form as shown in FIG. 41 (a), but it can be a bronze component E8 having two cooling water pipes E5a and E5b on each side as shown in FIG. 41 (b).

The right gas jacket E22 is box-shaped. Its left side E221 has an opening leading to the right heating coil E21, and both the left end of its front E222 and the left end of its back E223 have a semicircular cutout to fit the pipe P to be heated. Its right side E224 has a gas nozzle E9 to feed shield gas, while its bottom has a cutout piercing into the lower connecting component (no clear indication is given in the drawing). As shown in FIG. 39, the right side E224 has a connecting pipe E56 to be connected to the cooling water supply channel E54 and a connecting pipe E57 to be connected to the cooling water discharge channel E55. On the back E225, sliding components E226 and E226 are installed in a certain interval which slide on the guide rails R and R mounted on the bed B. The right gas jacket E22 of the above construction is connected to the right heating coil E21 in the appropriate way. The top E227 of the right gas jacket E22 is not specifically indicated in the drawing, however, it is freely opened and closed so that it can be clamped by piercing the bolt E6 through the hole E251 in the upper connection component E25. The connection between the connecting pipe E56 and the cooling water supply pipe (not shown), the connection between the connecting pipe E57 and the cooling water discharge pipe (not shown), and the connection between the gas nozzle E9 and the shield gas pipe (not shown) are all made with flexible tubes, although these are not illustrated in the drawings.

The right block driving means E23 concretely comprises a hydraulic cylinder E23A hooked on the right side E224 of the right gas jacket E22 and a pair of guide-rails R and R on which the right gas jacket 22 runs.

The hydraulic cylinder E23A and the guide-rails R and R are installed on the bed B in the direction of the pipe P to be heated. With the right block driving means E23 of the above construction, when the piston-rod E231 moves forward and moves backward, the sliding component E226 slides on the guide-rail R and the right gas jacket E22 also moves forward and moves backward for the pipe P.

The left heating coil E31, the left gas jacket E32, and the left block driving means E33 are all constructed in the same way as the right heating coil E21, the right gas jacket E22, and the right block driving means E23 respectively, except that they are positioned symmetrically with those of the right side.

The following describes the procedures to heat the pipe P with the heating coil E1 of the above construction.

1. Move backward the piston rods E231 and E331 of the hydraulic cylinders E23A and E33A of the right block driving means E23 and the left block driving means E33 respectively to move backward the right heating coil E21 and the left heating coil E31 respectively so that the both heating coils are standing by. (see the dotted lines in FIG. 39)
2. Feed down the pipe P and set it in a specified place. In this case, set the pipe P so that the distance between the lower outside of the pipe P and the lower inside of the heating coil E21 (E31) is shorter than the distance between the upper outside of the pipe P and the upper inside of the heating coil E21 (E31), thereby the upper part of the pipe P is prevented from more heating by heated shield gas. As a result, the pipe P is heated uniformly.
3. Move forward the piston-rods E231 and E331 of the hydraulic cylinders E23A and E33A of the right block driving means E23 and the left block driving means E33 respectively to move forward the right heating coil E21 and the left heating coil E31 so that the both heating coils contact to each other.
4. Open the tops E227 and E327 of the right gas jacket E22 and the left gas jacket E32 respectively, and pierce the bolt E6 through the holes E251 and E351 of the upper connection components E25 and E35 of the right heating coil E21 and the left heating coil E31 respectively. Then, by screwing the nut E6a into the bolt E6, clamp the upper connecting component E25 and the upper connecting component E35 to each other.
5. Insert an insulating plate 1 between the lower connecting component E26 and the lower connecting component E36 of the right heating coil E21 and the left heating coil E31 respectively, pierce the bolt E6 (insulated) through the holes E261 and E361, and clamp the lower connecting component E26 and the lower connecting component E36 to each other by screwing the nut E6a into the bolt E6.
6. Supply shield gas (argon gas) from the gas nozzle E9 into the right and the left gas jackets E22 and E32 respectively, and shield the inside of the gas jackets E22 and 3E2.
7. Supply cooling water into the right and the left heating coils E21, E31 respectively.
8. Supply the high frequency current (1 kHz to 300 kHz) from the power source E to the heating coil E1, and heat the pipe P by induction heating.
9. Upon completion of heating, stop supplying the current to the heating coil E1.
10. Move backward the piston-rods E231 and E331 of the hydraulic cylinders E23A and E33A of the the the right block driving means E23 and the left block driving means E33 respectively to move backward the right heating coil E21 and the left heating coil E31.
11. Finish the heated pipe P by giving it the appropriate treatment, and send it upward to the next process.

As described above, in Embodiment 18, the material P such as a long pipe can be very quickly placed in and displaced out of the heating coil E1, since the heating coil E1 is split into the right heating coil E21 and the left heating coil E31, and both of them are free to open and close to allow the pipe P to go through. With this, the work efficiency of induction heating of the material P, such as a long pipe, remarkably improves.

Embodiment 19

Figure 44:
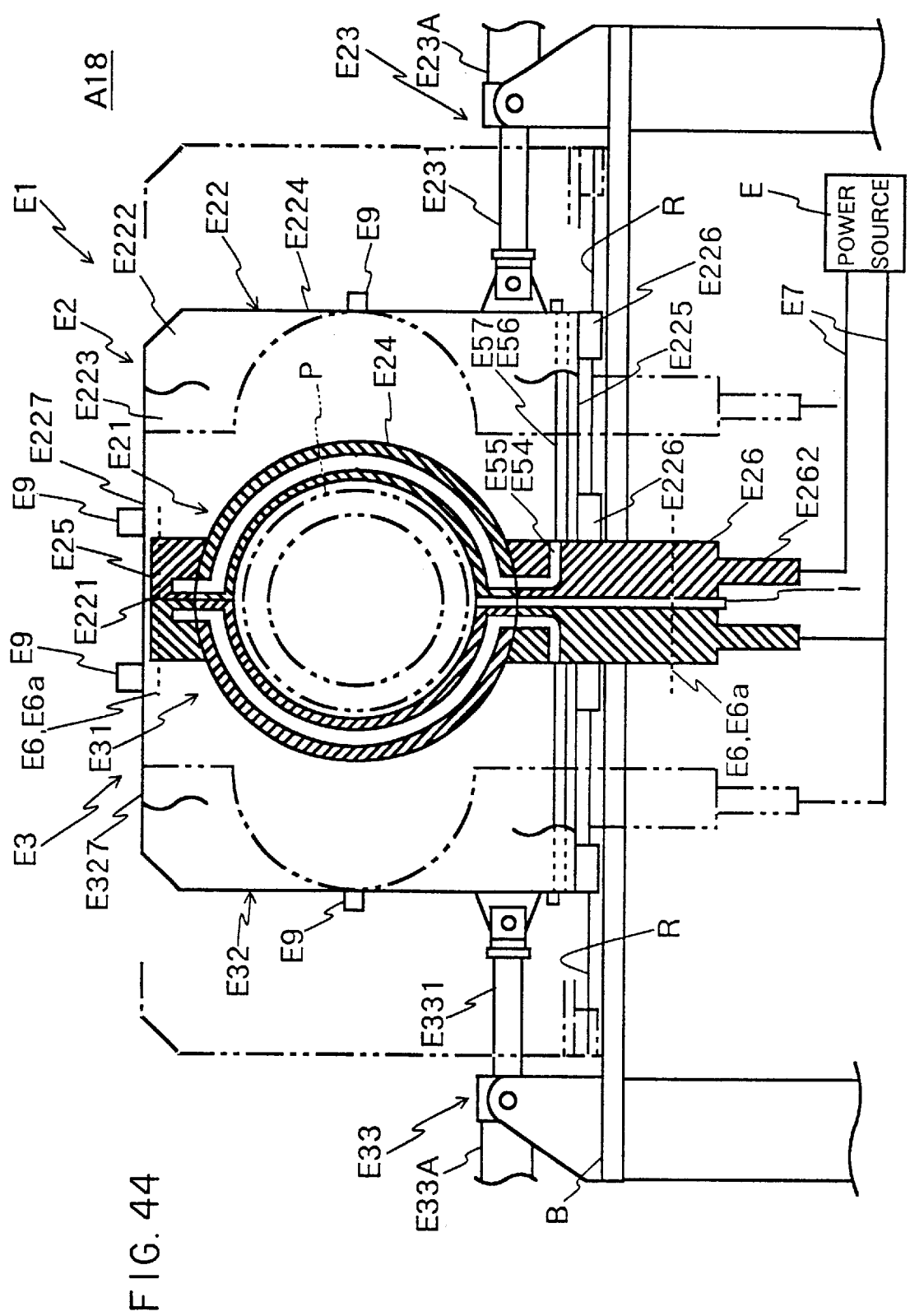
FIG. 44 is a front-views of the section major part of the heating coil under the Embodiment 18.

FIG. 44 shows a heating coil under a diffusion bonding apparatus A18 of Embodiment 19 pertinent to the present invention. This Embodiment 19 is a modification of Embodiment 18. It has gas nozzles E9 and E9 on the tops of the right gas jacket E22 and the left gas jacket E32 respectively. The construction of the heating coil E1 under Embodiment 19 of the present invention is the same of that of Embodiment 18 except for the above.

As described above, in Embodiment 19, the right gas jacket E22 and the left gas jacket E32 have the gas nozzles E9 and E9 respectively on their tops. Because of the cooling effect produced by the shield gas ejecting through the gas nozzles E9 and E9, the upper part of the pipe P is prevented from being excessively heated. Thus, the pipe P is uniformly heated.

In Embodiment 18 and Embodiment 19, the materials to be heated are fed in a horizontal direction. However, a vertical feeding is also possible. In that case, because the heated shielding gas stays in the upper part of the gas jacket, it is desirable to have the gas nozzles on the top of the gas jacket for the uniform heating of the material. Also, according to the above Embodiment 18 and Embodiment 19, the split coils are clamped with bolts and nuts. However, the means of clamping is not only limited to bolts and nuts, but also other means of adequate construction. It is not necessary to clamp the split coils with, for example, bolts and nuts, if the desirable electric current is secured.

Embodiment 20

Figure 45:
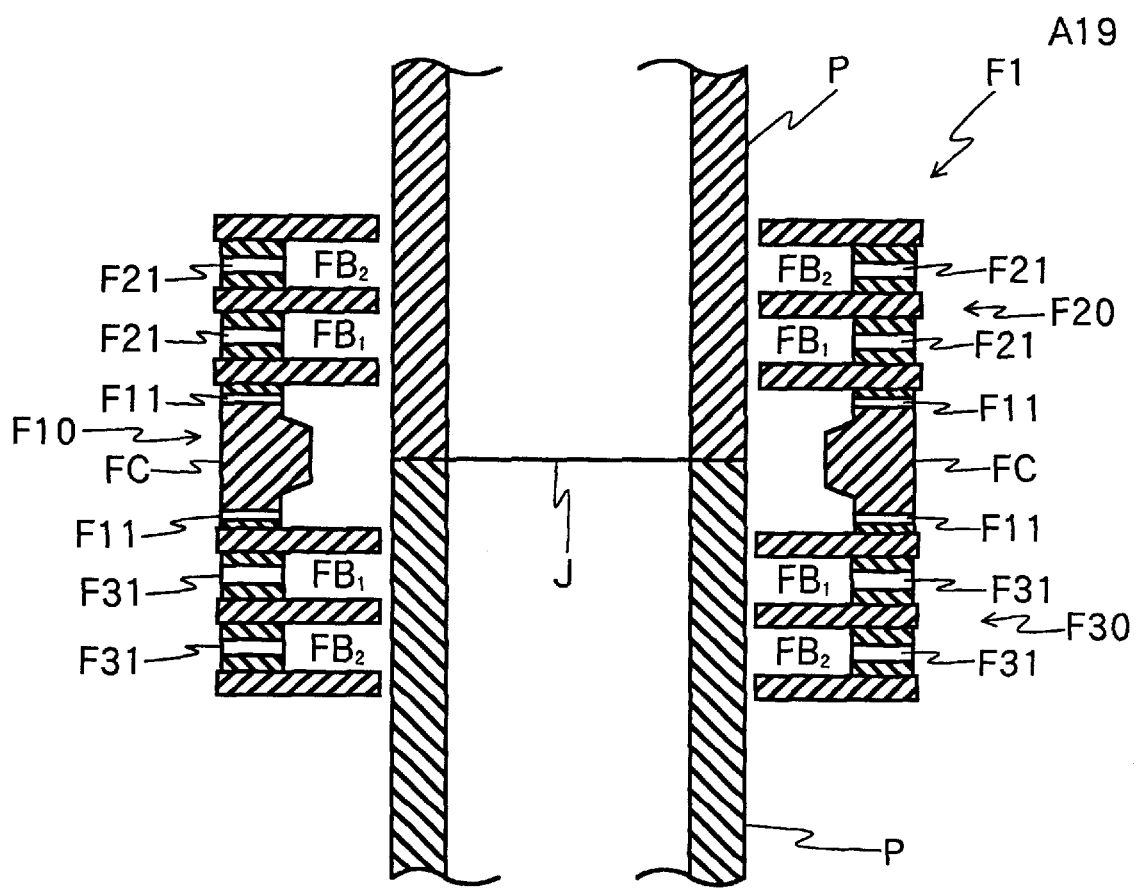
FIG. 45 is a section of the shielding device pertinent to Embodiments 20 under the present invention.
Figure 46A:
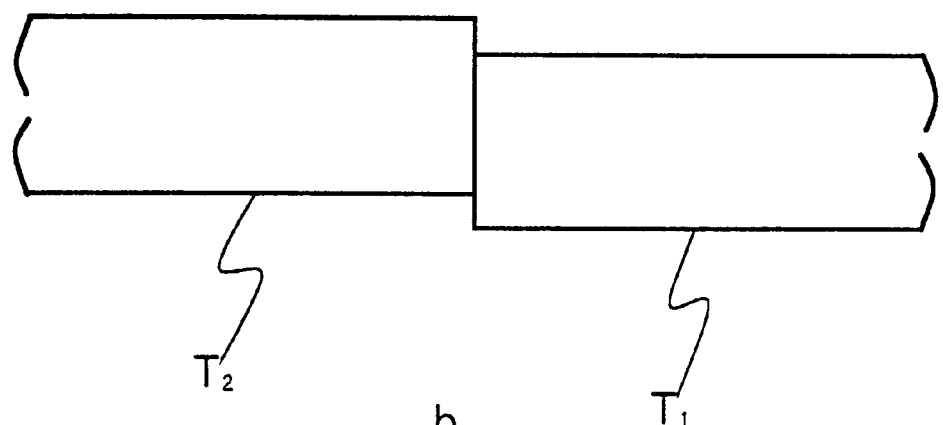
FIG. 46 is an exlanatory illustration illustrating the joint bonded by the conventional diffusion bonding apparatus.
Figure 46B:
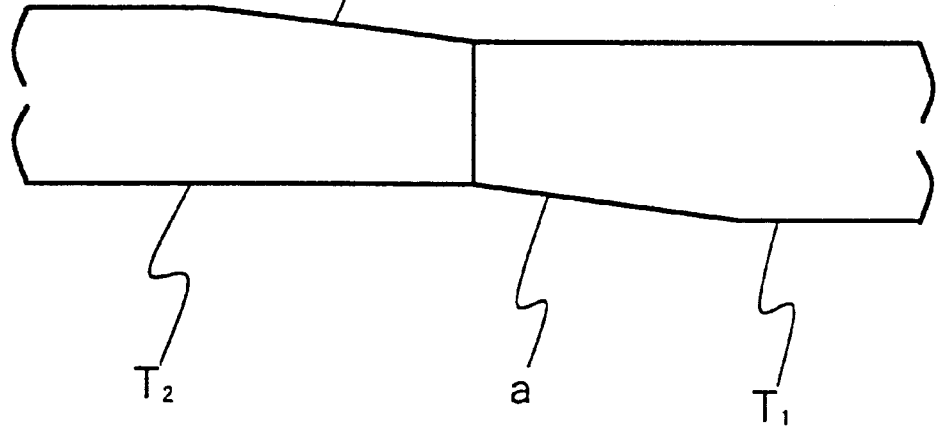
Figure 47:
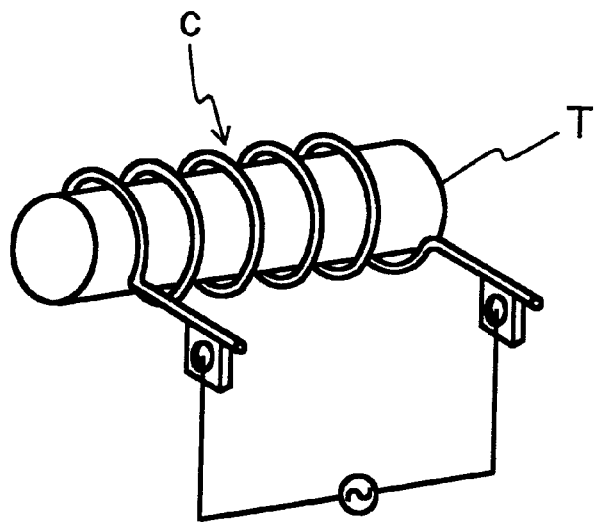
FIG. 47 is an illustration showing the induction heating method using the conventional heating coil.

FIG. 45 shows the section of the shielding device F1 under diffusion bonding apparatus A19 of Embodiment 20 pertinent to the present invention. This shielding device F1 is used in diffusion bonding where the material P is fed and discharged vertically. It comprises a main gas jacket F10 with a high frequency heating coil FC and shielding gas inlets F11; an upper gas jacket (a front gas jacket) F20 with shielding gas inlets F21, which is incorporated in the upper side (the front) of the main gas jacket F10; and a lower gas jacket (a back gas jacket) F30 with the shielding gas inlets F31, which is incorporated in the lower side (back) of the main gas jacket F10. The shielding gas inlets F11 are located to face to each other for the main gas jacket F10, while the the shielding gas inlets F21 and F31 are also located to face to each other for the upper gas jacket and the lower gas jacket.

As shown in FIG. 45, the upper gas jacket F20 and the lower gas jacket F30 comprises several blocks FB which have for the shielding gas inlets F21 and F31 respectively. In FIG. 45, there are two blocks FB located on the top and the bottom of the main gas jacket, i.e., the first block FB1 is located closer to the main gas jacket F10 and the second block FB2 is located further from the main gas jacket F10. However, it is possible to have more than two blocks. The gaps between the main gas jacket F10 and the material P; the upper gas jacket F20 and the material P; and the lower gas jacket F30 and the material P are as large as those created in the conventional devices.

Figure 48:
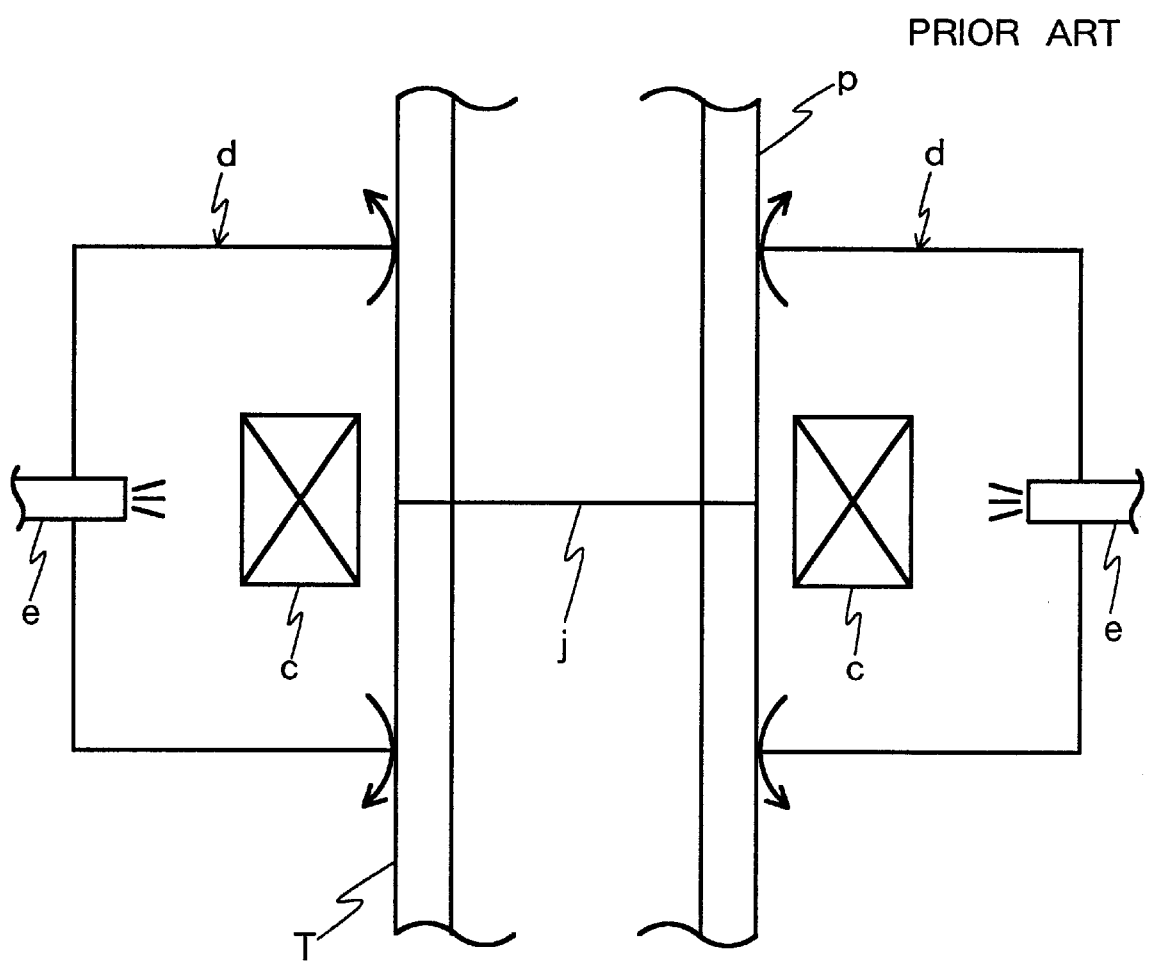
FIG. 48 is an illustration showing a conventional shielding device.

The shielding of the bonding part J in diffusion bonding under the above shielding device F1 is achieved by supplying the shielding gas in the main gas jacket F10, the upper gas jacket F20 and the lower gas jacket F30 through the shielding gas inlets F11, F21 and F31 respectively. The shielding gas fed into the gas jackets F10, F20 and F30 respectively runs through the gaps created between the material and each of the gas jackets F10, F20 and F30 respectively, and leaks out. However, the shielding gas fed into the main gas jacket F10 needs to run through the gap created between the material and the upper gas jacket F20 and the lower gas jacket F30 respectively until it leaks outside. In addition, the upper gas jacket F20 and the lower gas jacket F30 comprise the blocks FB1 and FB2. Thus, it takes much more time for the shielding gas to leak outside than it does in a conventional gas jackets as shown in FIG. 48. It means that the shielding gas fed into the main gas jacket F10 stays longer in the gas jacket. The prolonged presence of the shielding gas in the main gas jacket F10 helps heat the shielding gas from the heat generated during diffusion bonding. Consequently, although the shielding gas eventually leaks out, the above effects help avoid the degeneration in quality and a loss of strength of the bonding part J. In other words, the quality and the strength of the bonding part J is improved.

By keeping the internal pressure of the main gas jacket F10 a little lower than that of the upper gas jacket F20 and the lower gas jacket F30, the leaking of the shielding gas out of the main gas jacket F10 is further restricted, achieving a further improvement of the quality and the strength of the bonding part J.

In Embodiment 20, the materials are fed and discharged vertically. However, horizontal feeding and discharging is also possible. While the main gas jacket and the front and back gas jackets located in the front and back of the main gas jacket are divided into two respectively, it is preferable that each division moves forward and moves backward freely for the material.

Although the above describes the present invention according to its embodiments, it is not limited to these forms, and various changes and modifications are possible. For instance, in the above embodiments, the materials to be bonded are pipes or tubes. However, it is not only limited to pipes or tubes, but it can also be rails, for example. Also, in Embodiment 1, for example, the clamps are fixed and mobile, however, they can both be mobile.

As described above, the present invention gives diffusion bonding such an excellent effect that the ends of the materials can face parallel to each other at the time when the finishing of the ends is completed, requiring no adjustment of the ends of the materials to make them face parallel to each other at the time of the setting of the materials in the diffusion bonding apparatus and facilitating an easy and quick setting of the materials in the diffusion bonding apparatus.

Furthermore, as described above, extensively long pipes can be manufactured by diffusion bonding under the present invention.

Furthermore, as described above, the present invention achieves such an excellent effect that materials to be bonded contact each other without a difference in position between the two. Consequently, bonding the two materials under the above condition by diffusion bonding will cause no difference in the joint which may be otherwise caused by a difference in position, thus effectively avoiding a loss of strength owing to a difference in the joint.

Furthermore, as described above, the clamping section of the diffusion bonding apparatus under the present invention comprises the means of clamping that does not deform the ends of the materials, which otherwise would causes drop in the strength in the joint. Consequently, diffusion bonding employing the present invention achieves the excellent result that a deformation is not created in the ends of the materials while being clamped with the clamping mechanism. Subsequently, the strength in the joint does not drop.

Furthermore, as described above, under the present invention, the material to be heated, such as a long pipe, can be very quickly placed in and displaced out of the heating coil. Also, remarkable improvement of the work efficiency in induction heating is achieved.

Furthermore, as described above, under the present invention, the oxidation of the bonding part in diffusion bonding caused by its exposure to air is prevented, while the cooling of the circumference of the bonding part by the shielding gas is also prevented. Consequently, the quality and the strength of joints is remarkably improved.

We claim:

1. A diffusion bonding apparatus comprising:

means of finishing ends of materials to be bonded so that both ends face parallel to each other as desired;

a finishing means comprising a machining means which is symmetrically placed between two materials to be bonded, a first driving mechanism to move said machining means forward and backward for the ends of the materials to be bonded and a second driving mechanism to move said first driving mechanism sideways; or a first driving mechanism to move said machining means sideways and a second driving mechanism to move said first driving mechanism forward and backward for the ends of the materials to be bonded;

a bed;

a fixed clamp and a mobile clamp which are positioned facing each other on the bed;

a mobile clamp driving means, and a heating means which moves freely on said bed along the axis direction of the materials to be bonded.

* * * * *